United States Patent
Patterson

(10) Patent No.: US 8,489,628 B2
(45) Date of Patent: Jul. 16, 2013

(54) PHRASE-BASED DETECTION OF DUPLICATE DOCUMENTS IN AN INFORMATION RETRIEVAL SYSTEM

(75) Inventor: Anna L. Patterson, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/309,273

(22) Filed: Dec. 1, 2011

(65) Prior Publication Data

US 2012/0310902 A1 Dec. 6, 2012

Related U.S. Application Data

(60) Continuation of application No. 12/717,687, filed on Mar. 4, 2010, now Pat. No. 8,108,412, which is a division of application No. 10/900,012, filed on Jul. 26, 2004, now Pat. No. 7,711,679.

(51) Int. Cl.
*G06F 7/00* (2006.01)

(52) U.S. Cl.
USPC .......................................................... 707/767

(58) Field of Classification Search
USPC ....... 707/705, 758, 759, 763, 765, 767; 704/2
See application file for complete search history.

(56) References Cited

U.S. PATENT DOCUMENTS

| | | |
|---|---|---|
| 5,278,980 A | 1/1994 | Pedersen et al. |
| 5,321,833 A | 6/1994 | Chang et al. |
| 5,495,567 A | 2/1996 | Iizawa et al. |
| 5,523,946 A | 6/1996 | Kaplan et al. |
| 5,659,732 A | 8/1997 | Kirsch |
| 5,668,987 A | 9/1997 | Schneider |
| 5,694,593 A | 12/1997 | Baclawski |
| 5,696,962 A | 12/1997 | Kupiec |
| 5,715,443 A | 2/1998 | Yanagihara et al. |
| 5,721,897 A | 2/1998 | Rubinstein |
| 5,724,571 A | 3/1998 | Woods |
| 5,734,749 A * | 3/1998 | Yamada et al. ............... 382/187 |
| 5,754,939 A | 5/1998 | Herz et al. |
| 5,757,917 A | 5/1998 | Rose et al. |
| 5,771,378 A | 6/1998 | Holt et al. |
| 5,826,261 A | 10/1998 | Spencer |
| 5,835,087 A | 11/1998 | Herz et al. |

(Continued)

FOREIGN PATENT DOCUMENTS

| | | |
|---|---|---|
| EP | 1622055 A1 | 2/2006 |
| JP | 02-270067 A | 11/1990 |

(Continued)

OTHER PUBLICATIONS

Office Action received for U.S. Appl. No. 12/717,663, mailed on Jan. 5, 2011, 38 pages.

(Continued)

*Primary Examiner* — Hung T Vy
(74) *Attorney, Agent, or Firm* — Brake Hughes Bellerman LLP

(57) ABSTRACT

An information retrieval system uses phrases to index, retrieve, organize and describe documents. Phrases are identified that predict the presence of other phrases in documents. Documents are the indexed according to their included phrases. Related phrases and phrase extensions are also identified. Phrases in a query are identified and used to retrieve and rank documents. Phrases are also used to cluster documents in the search results, create document descriptions, and eliminate duplicate documents from the search results, and from the index.

58 Claims, 8 Drawing Sheets

U.S. PATENT DOCUMENTS

| | | |
|---|---|---|
| 5,845,278 A | 12/1998 | Kirsch et al. |
| 5,915,249 A | 6/1999 | Spencer |
| 5,920,854 A | 7/1999 | Kirsch et al. |
| 5,956,722 A | 9/1999 | Jacobson et al. |
| 5,960,383 A | 9/1999 | Fleischer |
| 5,983,216 A | 11/1999 | Kirsch et al. |
| 6,018,733 A | 1/2000 | Kirsch et al. |
| 6,070,158 A | 5/2000 | Kirsch et al. |
| 6,085,186 A | 7/2000 | Christianson et al. |
| 6,098,034 A | 8/2000 | Razin et al. |
| 6,178,419 B1 | 1/2001 | Legh-Smith et al. |
| 6,185,550 B1 | 2/2001 | Snow et al. |
| 6,185,558 B1 | 2/2001 | Bowman et al. |
| 6,298,344 B1 | 10/2001 | Inaba et al. |
| 6,349,316 B2 | 2/2002 | Fein et al. |
| 6,363,377 B1 | 3/2002 | Kravets et al. |
| 6,366,911 B1 | 4/2002 | Christy |
| 6,366,933 B1 | 4/2002 | Ball et al. |
| 6,415,283 B1 | 7/2002 | Conklin |
| 6,470,307 B1 | 10/2002 | Turney |
| 6,499,030 B1 | 12/2002 | Igata |
| 6,542,888 B2 | 4/2003 | Marques |
| 6,549,895 B1 | 4/2003 | Lai |
| 6,571,240 B1 | 5/2003 | Ho et al. |
| 6,594,658 B2 | 7/2003 | Woods |
| 6,596,030 B2 | 7/2003 | Ball et al. |
| 6,606,639 B2 | 8/2003 | Jacobson et al. |
| 6,638,314 B1 | 10/2003 | Meyerzon et al. |
| 6,654,739 B1 | 11/2003 | Apte et al. |
| 6,684,183 B1 | 1/2004 | Korall et al. |
| 6,691,106 B1 | 2/2004 | Sathyanarayan |
| 6,697,793 B2 | 2/2004 | McGreevy et al. |
| 6,721,728 B2 | 4/2004 | McGreevy et al. |
| 6,741,981 B2 | 5/2004 | McGreevy |
| 6,741,982 B2 | 5/2004 | Soderstrom et al. |
| 6,741,984 B2 | 5/2004 | Zaiken et al. |
| 6,769,016 B2 | 7/2004 | Rothwell et al. |
| 6,772,150 B1 | 8/2004 | Whitman et al. |
| 6,778,979 B2 | 8/2004 | Grefenstette et al. |
| 6,778,980 B1 | 8/2004 | Madan et al. |
| 6,820,237 B1 | 11/2004 | Abu-Hakima et al. |
| 6,823,333 B2 | 11/2004 | McGreevy |
| 6,832,224 B2 | 12/2004 | Gilmour |
| 6,839,682 B1 | 1/2005 | Blume et al. |
| 6,859,800 B1 | 2/2005 | Roche et al. |
| 6,862,710 B1 | 3/2005 | Marchisio |
| 6,886,010 B2 | 4/2005 | Kostoff |
| 6,910,003 B1 | 6/2005 | Arnold et al. |
| 6,947,923 B2 | 9/2005 | Cha et al. |
| 6,947,930 B2 | 9/2005 | Anick et al. |
| 6,963,867 B2 | 11/2005 | Ford et al. |
| 6,978,274 B1 | 12/2005 | Gallivan et al. |
| 6,981,040 B1 | 12/2005 | Konig et al. |
| 6,983,345 B2 | 1/2006 | Lapir et al. |
| 6,997,793 B1 | 2/2006 | Ito |
| 7,017,114 B2 | 3/2006 | Guo et al. |
| 7,028,026 B1 | 4/2006 | Yang et al. |
| 7,028,045 B2 | 4/2006 | Franz et al. |
| 7,051,014 B2 | 5/2006 | Brill et al. |
| 7,051,023 B2 | 5/2006 | Kapur et al. |
| 7,051,024 B2 | 5/2006 | Fein et al. |
| 7,058,589 B1 | 6/2006 | Leamon et al. |
| 7,085,771 B2 | 8/2006 | Chung et al. |
| 7,089,236 B1 | 8/2006 | Stibel |
| 7,096,220 B1 | 8/2006 | Seibel et al. |
| 7,130,790 B1 * | 10/2006 | Flanagan et al. .................. 704/2 |
| 7,137,062 B2 | 11/2006 | Kaufman et al. |
| 7,137,065 B1 | 11/2006 | Huang et al. |
| 7,139,756 B2 * | 11/2006 | Cooper et al. ........................ 1/1 |
| 7,149,748 B1 | 12/2006 | Stephan |
| 7,151,864 B2 | 12/2006 | Henry et al. |
| 7,155,243 B2 | 12/2006 | Baldwin et al. |
| 7,158,983 B2 | 1/2007 | Willse et al. |
| 7,162,473 B2 | 1/2007 | Dumais et al. |
| 7,171,619 B1 | 1/2007 | Bianco |
| 7,194,483 B1 | 3/2007 | Mohan et al. |
| 7,200,802 B2 | 4/2007 | Kawatani |
| 7,206,389 B1 | 4/2007 | Dumoulin et al. |
| 7,240,064 B2 | 7/2007 | Risvik et al. |
| 7,243,092 B2 | 7/2007 | Woehler et al. |
| 7,254,580 B1 | 8/2007 | Gharachorloo et al. |
| 7,263,530 B2 | 8/2007 | Hu et al. |
| 7,310,632 B2 | 12/2007 | Meek et al. |
| 7,328,401 B2 | 2/2008 | Obata et al. |
| 7,346,839 B2 | 3/2008 | Acharya et al. |
| 7,356,527 B2 | 4/2008 | Carmel et al. |
| 7,395,501 B2 | 7/2008 | Graham et al. |
| 7,426,507 B1 | 9/2008 | Patterson |
| 7,454,449 B2 | 11/2008 | Plow et al. |
| 7,464,264 B2 | 12/2008 | Goodman et al. |
| 7,483,820 B2 | 1/2009 | Yang |
| 7,483,871 B2 | 1/2009 | Herz |
| 7,536,408 B2 | 5/2009 | Patterson |
| 7,562,066 B2 | 7/2009 | Kawatani |
| 7,567,959 B2 | 7/2009 | Patterson |
| 7,580,921 B2 | 8/2009 | Patterson |
| 7,580,929 B2 | 8/2009 | Patterson |
| 7,584,175 B2 | 9/2009 | Patterson |
| 7,599,914 B2 | 10/2009 | Patterson |
| 7,603,345 B2 | 10/2009 | Patterson |
| 7,702,618 B1 | 4/2010 | Patterson |
| 7,711,679 B2 * | 5/2010 | Patterson ..................... 707/715 |
| 8,042,112 B1 | 10/2011 | Zhu et al. |
| 8,078,629 B2 | 12/2011 | Patterson |
| 8,108,412 B2 * | 1/2012 | Patterson ..................... 707/754 |
| 8,117,223 B2 | 2/2012 | Patterson |
| 2001/0000356 A1 | 4/2001 | Woods |
| 2001/0021938 A1 | 9/2001 | Fein et al. |
| 2002/0042707 A1 | 4/2002 | Zhao et al. |
| 2002/0042793 A1 | 4/2002 | Choi |
| 2002/0046018 A1 | 4/2002 | Marcu et al. |
| 2002/0046081 A1 | 4/2002 | Albazz et al. |
| 2002/0052901 A1 | 5/2002 | Guo et al. |
| 2002/0065857 A1 | 5/2002 | Michalewicz et al. |
| 2002/0078090 A1 | 6/2002 | Hwang et al. |
| 2002/0091671 A1 | 7/2002 | Prokoph |
| 2002/0138467 A1 | 9/2002 | Jacobson et al. |
| 2002/0143524 A1 | 10/2002 | O'Neil et al. |
| 2002/0147578 A1 | 10/2002 | O'Neil et al. |
| 2002/0174113 A1 | 11/2002 | Kanie et al. |
| 2002/0188587 A1 | 12/2002 | McGreevy |
| 2002/0188599 A1 | 12/2002 | McGreevy |
| 2003/0031996 A1 | 2/2003 | Robinson |
| 2003/0037041 A1 | 2/2003 | Hertz |
| 2003/0051214 A1 | 3/2003 | Graham et al. |
| 2003/0069877 A1 | 4/2003 | Grefenstette et al. |
| 2003/0078913 A1 * | 4/2003 | McGreevy ........................ 707/3 |
| 2003/0093790 A1 | 5/2003 | Logan et al. |
| 2003/0130993 A1 | 7/2003 | Mendelevitch et al. |
| 2003/0140309 A1 | 7/2003 | Saito et al. |
| 2003/0144995 A1 | 7/2003 | Franz et al. |
| 2003/0195877 A1 | 10/2003 | Ford et al. |
| 2003/0195937 A1 | 10/2003 | Kircher et al. |
| 2004/0006736 A1 | 1/2004 | Kawatani |
| 2004/0034633 A1 | 2/2004 | Rickard |
| 2004/0052433 A1 | 3/2004 | Henry et al. |
| 2004/0064438 A1 | 4/2004 | Kostoff |
| 2004/0068396 A1 * | 4/2004 | Kawatani ........................ 703/2 |
| 2004/0133560 A1 | 7/2004 | Simske |
| 2004/0153456 A1 | 8/2004 | Charnock et al. |
| 2004/0158580 A1 | 8/2004 | Carmel et al. |
| 2004/0186824 A1 | 9/2004 | Delic et al. |
| 2004/0186827 A1 | 9/2004 | Anick et al. |
| 2004/0225667 A1 | 11/2004 | Hu |
| 2004/0236736 A1 | 11/2004 | Whitman et al. |
| 2004/0260692 A1 | 12/2004 | Brill et al. |
| 2005/0043015 A1 | 2/2005 | Muramatsu |
| 2005/0043940 A1 | 2/2005 | Elder |
| 2005/0060295 A1 | 3/2005 | Gould et al. |
| 2005/0060651 A1 | 3/2005 | Anderson |
| 2005/0071310 A1 | 3/2005 | Eiron et al. |
| 2005/0071328 A1 | 3/2005 | Lawrence |
| 2005/0076084 A1 | 4/2005 | Loughmiller et al. |
| 2005/0154723 A1 | 7/2005 | Liang |
| 2005/0165778 A1 | 7/2005 | Obata et al. |
| 2005/0192936 A1 | 9/2005 | Meek et al. |
| 2005/0198559 A1 | 9/2005 | Fujiwara |

| | | | |
|---|---|---|---|
| 2005/0216564 | A1 | 9/2005 | Myers et al. |
| 2005/0256848 | A1 | 11/2005 | Alpert et al. |
| 2005/0278620 | A1 | 12/2005 | Baldwin et al. |
| 2006/0018551 | A1 | 1/2006 | Patterson |
| 2006/0020571 | A1 | 1/2006 | Patterson |
| 2006/0020607 | A1 | 1/2006 | Patterson |
| 2006/0031195 | A1 | 2/2006 | Patterson |
| 2006/0036593 | A1 | 2/2006 | Dean et al. |
| 2006/0041521 | A1 | 2/2006 | Oral et al. |
| 2006/0053157 | A1 | 3/2006 | Pitts |
| 2006/0106792 | A1 | 5/2006 | Patterson |
| 2006/0143174 | A1 | 6/2006 | Dey et al. |
| 2006/0143714 | A1 | 6/2006 | Peterson et al. |
| 2006/0200464 | A1 | 9/2006 | Gideoni et al. |
| 2006/0294124 | A1 | 12/2006 | Cho |
| 2007/0239671 | A1 | 10/2007 | Whitman et al. |
| 2007/0244884 | A1 | 10/2007 | Yang |
| 2008/0005064 | A1 | 1/2008 | Sarukkai |
| 2008/0263202 | A1 | 10/2008 | George et al. |
| 2008/0306943 | A1 | 12/2008 | Patterson |
| 2009/0070312 | A1 | 3/2009 | Patterson |
| 2010/0030773 | A1 | 2/2010 | Patterson |
| 2010/0169305 | A1 | 7/2010 | Patterson |
| 2010/0281535 | A1 | 11/2010 | Perry, Jr. et al. |
| 2011/0131223 | A1 | 6/2011 | Patterson |
| 2012/0197885 | A1 | 8/2012 | Patterson |

FOREIGN PATENT DOCUMENTS

| | | |
|---|---|---|
| JP | 2008-305730 A | 11/1996 |
| JP | 10207909 | 8/1998 |
| JP | 11293535 | 10/1999 |
| JP | 2000-331032 A | 11/2000 |
| JP | 2002-132789 A | 5/2002 |
| JP | 2003208433 | 7/2003 |
| JP | 2003-281183 A | 10/2003 |
| JP | 2004-005600 A | 1/2004 |
| JP | 2004-046438 A | 2/2004 |
| JP | 2004-139150 A | 5/2004 |
| JP | 2004192546 | 7/2004 |
| JP | 2008-305730 A | 12/2008 |
| KR | 1020020045343 | 6/2002 |
| KR | 20020107844 A1 | 8/2002 |
| KR | 08249354 | 9/2011 |
| WO | 97/38390 A2 | 10/1997 |
| WO | 0142880 A2 | 6/2001 |
| WO | 2009033098 A1 | 3/2009 |

OTHER PUBLICATIONS

Office Action Response filed for U.S. Appl. No. 11/851,962, filed Mar. 14, 2011, 16 pages.
Office Action received for U.S. Appl. No. 11/851,962, mailed on Nov. 12, 2010, 35 pages.
Notice of Allowance received for U.S. Appl. No. 11/851,962, mailed on Jun. 6, 2011, 14 pages.
Office Action received for U.S. Appl. No. No. 12/578,339, mailed on Apr. 15, 2011, 19 pages.
Office Action received for Japanese Patent Application No. 2005-216530, mailed on Nov. 30, 2010, 6 pages of English Translation and 7 pages of Office Action.
Office Action Response filed for European Patent Application No. 05254644.7 filed on Mar. 25, 2011, 5 pages.
Office Action received for European Patent Application No. 05254644.7, mailed on Sep. 17, 2010, 6 pages.
Office Action received for Canadian Patent Application No. 2,513,851, mailed on Mar. 14, 2011, 4 pages.
Office Action received for Chinese Patent Application No. 200510085371.5, mailed on Jan. 19, 2011, 1 page of English Translation and 3 pages of Office Action.
Office Action Response filed for Chinese Patent Application No. 200510085371.5, filed on Mar. 21, 2011, 2 pages of English Translation and 2 pages of Office Action Response.
Office Action received for Japanese Patent Application No. 2005-216528, mailed on Nov. 2, 2010, 3 pages of English Translation and 3 pages of Office Action.
Office Action received for U.S. Appl. No. 12/578,339, mailed on Sep. 17, 2010, 40 pages.
Office Action received for Canadian Patent Application No. 2,513,850, mailed on Oct. 7, 2010, 7 pages.
Office Action Response filed for Canadian Patent Application No. 2,513,853, filed Mar. 15, 2011, 84 pages.
Office Action received for Canadian Patent Application No. 2,595,674, mailed on Jun. 14, 2010, 3 pages.
Office Action Response filed for European Patent Application No. 05254646.2, filed on Jan. 27, 2011, 14 pages.
Office Action Response Filed for European Patent Application No. 05254647.0, filed on Jan. 27, 2011, 13 pages.
Extended European Search Report Response Filed for European Patent Application No. 08799272.3, filed on Mar. 1, 2011, 12 pages.
Office Action Response filed for Japanese Patent Application No. 2005216529, filed on May 30, 2011, 13 pages of English Translation and 29 pages of Office Action.
Kataoka, M. et al., "A System of Automatic Keywords Extraction and Related Data Collection for Japanese Text", Journal of Japan Society for Fuzzy Theory and Systems, vol. 9, No. 5, Oct. 1997, pp. 710-717 (English Abstract p. 717).
Notice of Allowance for U.S. Appl. No. 11/851,962, mailed Sep. 23, 2011, 20 pages.
Response for U.S. Appl. No. 11/851,962, filed Aug. 28, 2011, 28 pages.
Notice of Allowance for U.S. Appl. No. 12/505,088, mailed Nov. 18, 2011, 59 pages.
Response for CA Application No. 2,513,851, filed Sep. 14, 2011, 24 pages.
Office Action for CN Application No. 200880105846.4, mailed Aug. 1, 2011, 9 pages.
Notice of Allowance for JP Application No. 2007-552403, mailed Nov. 4, 2011, 3 pages.
Office Action for KR Application No. 10-2005-0068059, mailed Oct. 26, 2011, 6 pages.
Office Action for KR Application No. 10-2005-0068057, mailed Oct. 27, 2011, 5 pages.
Office Action for KR Application No. 10-2005-0068058, mailed Aug. 23, 2011, 5 pages.
Risvik, "Multi-tier architecture for Web search engines", 2003, pp. 132-143.
Notice of Allowance for U.S. Appl. No. 10/900,021 mailed on Jun. 24, 2008, 7 pages.
Jones, S. et al., "Topic-Based Browsing Within a Digital Library Using Keyphrases", Proceedings of the Fourth ACM conference on Digital Libraries, Aug. 11-14, 1999, Berkeley, CA, ACM Press,1999, pp. 114-121.
Garner, Harold et al., "Gene Alert—A Sequence Search Results Keyword Parser", IEEE Engineering in Medicine and Biology Magazine, vol. 17, Mar.-Apr. 1998, pp. 119-122.
Fetterly, et al., "Detecting Phrase-Level Duplication on the World Wide Web", Proceedings of the 28th annual International ACM SIGIR Conference on Research and Development in Information Retrieval (SIGIR '05), Aug. 15-19, 2005 , pp. 170-177.
Ntoulas, et al., "Detecting Spam Web Pages Through Content Analysis", Proceedings of the 15th International Conference on World Wide Web 2006 (WWW 2006), May 23-26, 2006, pp. 83-92.
Examiner's First Report on Australian Patent Application No. 2005203240, Sep. 13, 2007, 2 Pages.
Examiner's First Report on Australian Patent Application No. 2005203238, Sep. 10, 2007, 2 pages.
Examiner's First Report on Australian Patent Application No. 2005203239, Sep. 13, 2007, 2 Pages.
Caropreso, M. et al., "Statistical Phrases in Automated Text Categorization", Internet Publication—Technical Report, Retrieved from the Internet: http://dienst.isti.cnr.it/Dienst/Repository/2.0/Body/ercim.cnr.iei/2000-B4-007/, May 26, 2000, pp. 1-18.
Schutze, et al., "A Cooccurrence-based Thesaurus and Two Applications to Information Retrieval", Information Processing & Management, vol. 33(3), Elsevier, Great Britain.,1997, pp. 307-318.
PCT International Search Report and Written Opinion, PCT/US06/02709, Jun. 21, 2007, 9 Pages.
Chang, C.T. K., et al., "Performance and Implications of Semantic Indexing in a Distributed Environment.", Proceedings of the 8th International Conference on Information Knowledge Management, New York, NY, USA., 1999, pp. 391-398.

Chen, H. et al., "Automatic Thesaurus Generation for an Electronic Community System", Journal of the American Society for Information Science, vol. 46(3), Washington,USA., Apr. 1, 1995,175-193.

Cheung, F. et al., "An Efficient Algorithm for Incremental Update of Concept Spaces", University of Hong Kong Technical Report, Sep. 2002, pp. 1-16.

European Search Report for EP Patent Application No. EP05254644. 7-2201, mailed on Oct. 21, 2005, 10 pages.

European Search Report for EP Patent Application No. EP05254645. 4-2201, mailed on Sep. 21, 2005.12 pages.

European Search Report for EP Patent Application No. EP05254646. 2-2201, mailed on Oct. 11, 2005, 11 pages.

European Search Report for EP Patent Application No. EP05254647. 0-2201, mailed on Oct. 4, 2005, 10 pages.

Gedeon, T. D., et al., "Hierarchical Co-Occurrence Relations.", IEEE International Conference on Systems, Man, and Cybernetics, San Diego, CA, vol. 3, New York, USA., Oct. 11-14, 1998, pp. 2750-2755.

House, "Save Web Time with WebSumm", [online] Jul. 1997 [Retrieved on May 7, 2005], Retrieved from the Internet.

Jing, Y. et al., "An Association Thesaurus for Information Retrieval.", Proceedings of RIAO-94, 4th International Conference on Intelligent Multimedia Information Retrieval Systems and Management, New York, NY, Oct. 11-13, 1994, pp. 1-15.

Kando, N. "Text Structure Analysis as a Tool to Make Retrieved Documents Usable", Proceedings of the 4th International Workshop on Information Retrieval With Asian Languages, [online] [Retrieved on Oct. 5, 2005) Retrieved from the Internet: <URL: http://research.niLac.jp/{kando/>, Nov. 11, 1999, pp. 1-10.

Leroy, G. et al., "Meeting Medical Terminology Needs—The Ontology-Enhanced Medical Concept Mapper", IEEE Transactions on Information Technology in Biomedicine, vol. 5,(4). USA., Dec. 2001, pp. 261-270.

Jones, Steve et al., "Interactive Document Summarisation Using Automatically Extracted Keyphrases", Proceedings of the 35th Annual Hawaii International Conference on System Sciences, 2002, pp. 1160-1169.

Lin, C. S., et al., "An Automatic Indexing and Neural Network Approach to Concept Retrieval and Classification of Multilingual (Chinese-English) Documents", IEEE Transactions on Systems, Man and Cybernetics. Part B: Cybernetics, vol. 26(1), USA, Feb. 1, 1996, pp. 75-88.

Mandala, R. et al., "Combining Multiple Evidence From Different Types of Thesaurus for Query Expansion.", Proceedings of SIGIR'99 22nd International Conference on Research and Development in Information Retrieval, (Association for Computing Machinery) New York, NY, USA., (Aug. 1999),191-197.

Nguyen, H. V., et al., "Mining 'Hidden Phrase' Definitions from the Web.", Proceedings of the Fifth Asia-Pacific Web Conference, Xian, China, (Apr. 2003),pp. 1-11.

Pretschner, A. et al., "Ontology Based Personalized Search", Proceedings of the 11th IEEE International Conference on Tools with Artificial Intelligence, Nov. 9, 1999-Nov. 11, 1999, IEEE Computational Intelligence Society, Chicago IL., USA., (Nov. 1999),391-398.

Srinivasan, P. "Optimal Document-Indexing Vocabulary for Medline.", Information Processing & Management, vol. 32(5). Elsevier, Barking, Great Britain., (Sep. 1996),503-514.

Yun, Bo-Hyun et al., "Semantic-Based Information Retrieval for Content Management and Security.", Computational Intelligence, vol. 19(2), Blackwell Publishers, USA, (May 2003),87-110.

Ahonen-Myka, Helena et al., "Finding Co-Occuring Text Phrases by Combining Sequence and Frequent Set Discovery", Proceedings of 16th International Joint Conference on Artificial Intelligence IJCAI-99 Workshop on Text Mining: Foundations Techniques and Applications, (Jul. 31, 1999),1-9.

Chen, Hsinchun et al., "Automatic Construction of Networks of Concepts Characterizing Document Databases", IEEE Transactions on Systems, Man, and Cybernetics, vol. 22, No. 5, (Sep./Oct. 1992),885-902.

Examiner's First Report on Australian Patent Application No. 2005203237 mailed on Sep. 11, 2007, 2 pages.

Ahmed, S. et al., "Word Stemming to Enhance Spam Filtering", http://www.ceas.cc/papers-2004/167.pdf, First conference on Email and anti-Spam (CEAS) 2004 Proceedings, Jul. 30-31, 2004, 1-2 pages.

English translation with First Office Action from the State Intellectual Property Office for Chinese Patent Application No. 200510085370.0, dated Apr. 2008,14 pages.

English translation with First Office Action from the State Intellectual Property Office for Chinese Patent Application No. 200510085372.X, dated Mar. 2008, 19 pages.

English translation with First Office Action from the State Intellectual Property Office for Chinese Patent Application No. 200510085371.5, dated Apr. 2008, 10 pages.

English translation of First Office Action from the State Intellectual Property Office for Chinese Patent Application No. 200510085373.4, dated Mar. 2008, 4 pages.

Notice of Allowance for U.S. Appl. No. 10/900,055, mailed on Dec. 12, 2007, 20 pages.

Notice of Allowance for U.S. Appl. No. 10/900,259, mailed on Jan. 23, 2008, 15 pages.

Notice of Allowance for U.S. Appl. No. 10/900,075 , mailed on Aug. 22, 2008, 14 pages.

Notice of Allowance for U.S. Appl. No. 10/900,012 , mailed on Sep. 12, 2008, 9 pages.

International Search Report and Written Opinion for PCT Application No. PCT/US2008/75492 mailed on Nov. 18, 2008, 10 pages.

Aizawa, A "An information-theoretic perspective of tf-idf measures", Information Processing and Management, 1 (39), 2003, pp. 45-65.

Jones, S. et al., "Interactive document summarisation using automatically extracted keyphrases", System Sciences, 2001. HICSS. Proceedings of the 35th Annual Hawaii International Conference on Jan. 7-10, 2001, Piscataway, NJ,USA,IEEE, pp. 1287-1296.

Jagadeesh, J. et al., "Sentence Extraction Based Single Document Summarization", International Institute of Information Technology, Hyderabad, India, Mar. 19-20, 2005, 5 pages.

Notice of Allowance for U.S. Appl. No. 10/900,055, mailed on Jan. 12, 2009, 12 pages.

Jones, Steve et al., "Interactive Document Symmarisation Using Automatically Extracted Keypharses", Department of Computer Science,Universality of Waikato Private Bag 3105,Hamilton, NewZealand, 2002, pp. 1-3.

Notice of Allowance for U.S. Appl. No. 10/900,075, mailed on Feb. 20, 2009, 14 pages.

Notice of Allowance for U.S. Appl. No. 11/043,695, mailed on Mar. 23, 2009, 12 pages.

Notice of Allowance for U.S. Appl. No. 10/900,021, mailed on Dec. 10, 2008 ,10 pages.

Office Action for Chinese Patent Application No. 200680007173.X (with English Translation), mailed on Oct. 9, 2009, 13 pages.

Extended European Search Report for EP Application No. 06719537. 0, mailed Apr. 16, 2010, 6 pages.

Taniar, D., et al, "A Taxonomy of Indexing Schemes for Parallel Database Systems", Distributed and Parallel Databases, vol. 12, No. 1, Jul. 2002, pp. 73-106.

Byeong-Soo, J., et al, "Inverted File Partitioning Schemes in Multiple Disk Systems", IEEE Transactions on Parallel and Distributed Systems, vol. 6, No. 2, Feb. 1, 1995, pp. 142-153.

Stanfill, C., et al, "Information Retrieval on the Connection Machine: 1 to 8192 Gigabytes", Information Processing and Management, vol. 27, No. 4, 1991, pp. 285-310.

Stanfill, C., "Partitioned Posting Files: A Parallel Inverted File Structure for Information Retrieval", Paper presented at the International Conference on Research and Development in Information Retrieval, Sep. 1990, pp. 413-428.

Tomasic, A, et al, "Caching and Database Scaling in Distributed Shared-Nothin Information Retrieval Systems", ACM, 1993, pp. 129-138.

Tomasic, A, et al, "Caching and Database Scaling in Distributed Shared-Nothing Information Retrieval Systems", Stanford University Computer Science Technical Report STAN-CS-92/1456, Dec. 22, 1992, 21 pages.

Tomasic, A, "Performance of Inverted Indices in Distributed Text Document Retrieval Systems", Standford University Computer Science Technical Report STAN-CS-92/1434, Jun. 23, 1992, 25 pages.

Tomasic, A, et al, "Performance of Inverted Indices in Shared-Nothing Distributed Text Document Information Retrieval Systems", Proceedings of the Second International Conference on Parallel and Distributed Information Systems, 1993, 10 pages.

Tomasic, A, et al, "Query Processing and Inverted Indices in Shared-Nothing Text Document Information Retrieval Systems", VLDB Journal, 2, 1993, pp. 243-275.

Office Action for Chinese Patent Application No. 200510085371.5 (included English Translation), mailed on Jun. 17, 2010, 6 pages.

Office Action for European Application No. 05254647.0, mailed Sep. 17, 2010, 10 pages.

Office Action for European Application No. 05254646.2, mailed Sep. 17, 2010, 5 pages.

Extended European Search Report for EP Application No. 08799272.3, mailed Aug. 18, 2010, 5 pages.

Non Final Office Action received for U.S. Appl. No. 10/900,021, mailed on Jul. 16, 2007, 26 pages.

Final Office Action received for U.S. Appl. No. 10/900,021, mailed on Feb. 7, 2008, 28 pages.

Notice of Allowance received for U.S. Appl. No. 10/900,021, mailed on Oct. 20, 2008, 13 pages.

Non Final Office Action received for U.S. Appl. No. 10/900,021, mailed on Jan. 17, 2007, 24 pages.

Examiner's First Report for Australian Patent Application No. 2010200478, mailed on Jul. 26, 2011, 1 page.

Office Action for Canadian Patent Application No. 2,513,852, mailed on Oct. 20, 2010, 4 page.

Office Action for European Patent Application No. 05254646.2, mailed on Sep. 17, 2010, 5 pages.

Office Action for Chinese Patent Application No. 200680007173.X (with English Translation), mailed on May 21, 2010, 12 pages.

Office Action for Japanese Patent Application No. P2005-216527, mailed on Nov. 9, 2010, 12 pages.

Office Action for Chinese Patent Application No. 200510085371.5 (with English Translation), mailed on Jan. 29, 2010, 9 pages.

Office Action Response for Japanese Patent Application No. 2005-216529, filed on May 30, 2011, 42 pages.

Office Action for CA Application No. 2,595,674, mailed Feb. 1, 2011, 2 pages.

Office Action for KR Application No. 20050068056, mailed Jul. 13, 2011, 5 pages.

Examination Notification Art. 94(3) mailed Jan. 2, 2013 for EP Application No. 08799272.3, 8 pages.

Office Action Response and RCE for U.S. Appl. No. 12/506,088, filed Jun. 14, 2012, 12 pages.

Office Action Response and RCE for U.S. Appl. No. 12/717,663, filed Jul. 10, 2012, 19 pages.

Office Action Response for CN Application No. 201110200364.0, filed Aug. 27, 2012, 4 pages.

First Examiners Report for AU Application No. 2008296071, mailed Jun. 12, 2012, 2 pages.

Advisory Action for U.S. Appl. No. 12/717,663, mailed Jan. 20, 2012, 3 pages.

Office Action Response for CN Application No. 201110198660.1 (with Translation), filed Sep. 7, 2012, 36 pages.

Office Action Response for CN Application No. 201110200374.4 (with Translation), filed Sep. 7, 2012, 38 pages.

Office Action Response for CA Application No. 2513851, filed Jul. 12, 2012, 19 pages.

Office Action Response for CA Application No. 2513852, filed Jun. 12, 2012, 10 pages.

Office Action for EP Application No. 06719537.0, mailed Feb. 9, 2012, 3 pages.

Office Action Response for EP Application No. 06719537.0, mailed Mar. 6, 2012, 18 pages.

Office Action for U.S. Appl. No. 12/717,663, mailed Apr. 30, 2012, 40 pages.

Notice of Allowance for U.S. Appl. No. 12/506,088, mailed Mar. 14, 2012, 18 pages.

Office Action Response for U.S. Appl. No. 12/717,663, filed Jan. 9, 2012, 19 pages.

Office Action for CA Application No. 2513851, mailed Jan. 12, 2012, 6 pages.

Office Action for CA Application No. 2513852, mailed Dec. 12, 2011, 2 pages.

Office Action Response for KR Application No. 20050068056, filed Jan. 12, 2012, 18 pages.

Office Action Response for CN Application No. 20080105846.4 (with Translation), filed Feb. 1, 2012, 12 pages.

Office Action for CN Application No. 201110198660.1 (with Translation), mailed Sep. 13, 2012, 3 pages.

Notice of Allowance for CA Application No. 2513852, mailed Sep. 10, 2012, 1 page.

Notice of Allowance for CA Application No. 2513853, mailed May 2, 2012, 3 pages.

Chen, J., et al, "Diverse Topic Phrase Extraction through Latent Semantic Analysis", Sixth International Conference on Data Mining, 2006, pp. 834-838.

Office Action for CN Application No. 201110198660.1 (with Translation), mailed Feb. 23, 2012, 8 pages.

Office Action for CN Applicaiton No. 201110200364.0 (with Translation), mailed Feb. 23, 2012, 9 pages.

Office Action for CN Application No. 201110200374.4 (with Translation), mailed Feb. 24, 2012, 6 pages.

Ahonen-Myka, et al, "Finding Co-occurring Text Phrases by Combining Sequence and Frequent Set Discovery", Proceedings of the International Joint Conference on Artificial Intelligence, Jul. 1999, 10 pages.

Notice of Allowance for JP Application No. JP-2005-216527 (with Translation), mailed Mar. 27, 2012, @ pages.

Notice of Allowance for JP Application No. JP-2005-216530 (with Translation), mailed Jan. 31, 2012, @ pages.

Notice of Allowance for JP Application No. JP-2005-216529 (with Translation), mailed Jan. 31, 2012, @ pages.

Final Office Action for JP Application No. 2005-216528 (with Translation), mailed Mar. 27, 2012, 8 pages.

Office Action Response for KR Application No. 2005-68057, filed Apr. 27, 2012, 16 pages.

Office Action Response for KR Application No. 2005-68058, filed Apr. 27, 2012, 19 pages.

Notice of Allowance for KR Application No. 2005-68056 (with Translation), mailed May 29, 2012, 3 pages.

Notice of Allowance for KR Application No. 200568057 (with Translation), mailed Sep. 27, 2012, 3 pages.

Office Action Response for KR Application No. 2005-68059, filed Apr. 26, 2012, 15 pages.

Notice of Allowance for KR Application No. 200568059 (with Translation), mailed Sep. 26, 2012, 3 pages.

Office Action for KR Application No. 2007-7018720 (with Translation), mailed May 1, 2012, 6 pages.

Ledeneva, et al, "Terms Derived from Frequent Sequences for Extractive Text Summarization", Computational Linguistics and Intelligent Text Processing, Feb. 18, 2007, pp. 593-604.

Leng, "Topic Detection Using Maximal Frequent Sequences", Thesis, National University of Singapore, Jan. 1, 2004, 96 pages.

Yap, et al, "Topic Detection Using MFSs", Advances in Applied Artificial Intelligence Lecture Notes in Computer Science;Lecture Notes in Artificial Intelligence, 2006, pp. 342-352.

* cited by examiner

History and Origin of the Australian Shepherd

*i-30*

Despite it's name, the Australian Shepherd as we know it was developed in the United States. In the late 1800's, the forrunners of today's "Aussies" came to the western and northwestern states as stock dogs for the Basque shepherds that accompanied the vast numbers of sheep being imported from Australia. These hard working, medium sized, "little blue dogs" impressed the American ranchers.

*i+30*

The Australian Shepherd Club of America (ASCA) was formed in 1957 to promote the breed, and several clubs kept breed registries. A unified standard was adopted in 1976, and the registries combined in 1980. (National Stock Dog Registry keeps a separate Australian Shepherd registry.) ASCA has promoted the breed with conformation, stock-dog (herding), and obedience programs, and a recently formed rescue program. An excellent book about the breed is "All About Aussies" by Jeanne Joy Hartnagle.

*FIG. 3*

PHRASE-BASED DETECTION OF DUPLICATE DOCUMENTS IN AN INFORMATION RETRIEVAL SYSTEM

CROSS REFERENCE TO RELATED APPLICATIONS

This application is a continuation of U.S. application Ser. No. 12/717,687, filed on Mar. 4, 2010, entitled "Phrase-Based Detection of Duplicate Documents in an Information Retrieval System", which, in turn, is a divisional of U.S. application Ser. No. 10/900,012, filed on Jul. 26, 2004, entitled "Phrase-Based Detection of Duplicate Documents in an Information Retrieval System", now U.S. Pat. No. 7,711,679; and is related to the following co-pending applications: U.S. application Ser. No. 10/900,055 filed on Jul. 26, 2004, entitled "Phrase-Based Indexing in an Information Retrieval System", now U.S. Pat. No. 7,536,408; U.S. application Ser. No. 10/900,041 filed on Jul. 26, 2004, entitled "Phrase-Based Searching in an Information Retrieval System", now U.S. Pat. No. 7,599,914; U.S. application Ser. No. 10/900,039 filed on Jul. 26, 2004, entitled "Phrase-Based Personalization of Searches in an Information Retrieval System", now U.S. Pat. No. 7,580,929; U.S. application Ser. No. 10/900,259, filed on Jul. 26, 2004, entitled "Automatic Taxonomy Generation in Search Results Using Phrases", now U.S. Pat. No. 7,426,507; and U.S. application Ser. No. 10/900,075, filed on Jul. 26, 2004, entitled "Phrase-Based Generation of Document Descriptions", now U.S. Pat. No. 7,584,175; all of which are co-owned and incorporated by reference herein.

FIELD OF THE INVENTION

The present invention relates to an information retrieval system for indexing, searching, and classifying documents in a large scale corpus, such as the Internet.

BACKGROUND OF THE INVENTION

Information retrieval systems, generally called search engines, are now an essential tool for finding information in large scale, diverse, and growing corpuses such as the Internet. Generally, search engines create an index that relates documents (or "pages") to the individual words present in each document. A document is retrieved in response to a query containing a number of query terms, typically based on having some number of query terms present in the document. The retrieved documents are then ranked according to other statistical measures, such as frequency of occurrence of the query terms, host domain, link analysis, and the like. The retrieved documents are then presented to the user, typically in their ranked order, and without any further grouping or imposed hierarchy. In some cases, a selected portion of a text of a document is presented to provide the user with a glimpse of the document's content.

Direct "Boolean" matching of query terms has well known limitations, and in particular does not identify documents that do not have the query terms, but have related words. For example, in a typical Boolean system, a search on "Australian Shepherds" would not return documents about other herding dogs such as Border Collies that do not have the exact query terms. Rather, such a system is likely to also retrieve and highly rank documents that are about Australia (and have nothing to do with dogs), and documents about "shepherds" generally.

The problem here is that conventional systems index documents are based on individual terms, rather than on concepts. Concepts are often expressed in phrases, such as "Australian Shepherd," "President of the United States," or "Sundance Film Festival". At best, some prior systems will index documents with respect to a predetermined and very limited set of 'known' phrases, which are typically selected by a human operator. Indexing of phrases is typically avoided because of the perceived computational and memory requirements to identify all possible phrases of say three, four, or five or more words. For example, on the assumption that any five words could constitute a phrase, and a large corpus would have at least 200,000 unique terms, there would approximately $3.2 \times 10^{26}$ possible phrases, clearly more than any existing system could store in memory or otherwise programmatically manipulate. A further problem is that phrases continually enter and leave the lexicon in terms of their usage, much more frequently than new individual words are invented. New phrases are always being generated, from sources such technology, arts, world events, and law. Other phrases will decline in usage over time.

Some existing information retrieval systems attempt to provide retrieval of concepts by using co-occurrence patterns of individual words. In these systems a search on one word, such as "President" will also retrieve documents that have other words that frequently appear with "President", such as "White" and "House." While this approach may produce search results having documents that are conceptually related at the level of individual words, it does not typically capture topical relationships that inhere between co-occurring phrases.

Accordingly, there is a need for an information retrieval system and methodology that can comprehensively identify phrases in a large scale corpus, index documents according to phrases, search and rank documents in accordance with their phrases, and provide additional clustering and descriptive information about the documents.

SUMMARY OF THE INVENTION

An information retrieval system and methodology uses phrases to index, search, rank, and describe documents in the document collection. The system is adapted to identify phrases that have sufficiently frequent and/or distinguished usage in the document collection to indicate that they are "valid" or "good" phrases. In this manner multiple word phrases, for example phrases of four, five, or more terms, can be identified. This avoids the problem of having to identify and index every possible phrases resulting from the all of the possible sequences of a given number of words.

The system is further adapted to identify phrases that are related to each other, based on a phrase's ability to predict the presence of other phrases in a document. More specifically, a prediction measure is used that relates the actual co-occurrence rate of two phrases to an expected co-occurrence rate of the two phrases. Information gain, as the ratio of actual co-occurrence rate to expected co-occurrence rate, is one such prediction measure. Two phrases are related where the prediction measure exceeds a predetermined threshold. In that case, the second phrase has significant information gain with respect to the first phrase. Semantically, related phrases will be those that are commonly used to discuss or describe a given topic or concept, such as "President of the United States" and "White House." For a given phrase, the related phrases can be ordered according to their relevance or significance based on their respective prediction measures.

An information retrieval system indexes documents in the document collection by the valid or good phrases. For each phrase, a posting list identifies the documents that contain the phrase. In addition, for a given phrase, a second list, vector, or other structure is used to store data indicating which of the related phrases of the given phrase are also present in each document containing the given phrase. In this manner, the system can readily identify not only which documents contain which phrases in response to a search query, but which documents also contain phrases that are related to query phrases, and thus more likely to be specifically about the topics or concepts expressed in the query phrases.

The use of phrases and related phrases further provides for the creation and use of clusters of related phrases, which represent semantically meaningful groupings of phrases. Clusters are identified from related phrases that have very high prediction measure between all of the phrases in the cluster. Clusters can be used to organize the results of a search, including selecting which documents to include in the search results and their order, as well as eliminating documents from the search results.

The information retrieval system is also adapted to use the phrases when searching for documents in response to a query. The query is processed to identify any phrases that are present in the query, so as to retrieve the associated posting lists for the query phrases, and the related phrase information. In addition, in some instances a user may enter an incomplete phrase in a search query, such as "President of the". Incomplete phrases such as these may be identified and replaced by a phrase extension, such as "President of the United States." This helps ensure that the user's most likely search is in fact executed.

The related phrase information may also be used by the system to identify or select which documents to include in the search result. The related phrase information indicates for a given phrase and a given document, which related phrases of the given phrase are present in the given document. Accordingly, for a query containing two query phrases, the posting list for a first query phrase is processed to identify documents containing the first query phrase, and then the related phrase information is processed to identify which of these documents also contain the second query phrase. These latter documents are then included in the search results. This eliminates the need for the system to then separately process the posting list of the second query phrase, thereby providing faster search times. Of course, this approach may be extended to any number of phrases in a query, yielding in significant computational and timing savings.

The system may be further adapted to use the phrase and related phrase information to rank documents in a set of search results. The related phrase information of a given phrase is preferably stored in a format, such as a bit vector, which expresses the relative significance of each related phrase to the given phrase. For example, a related phrase bit vector has a bit for each related phrase of the given phrase, and the bits are ordered according to the prediction measures (e.g., information gain) for the related phrases. The most significant bit of the related phrase bit vector are associated with the related phrase having the highest prediction measure, and the least significant bit is associated with the related phrase having a lowest prediction measure. In this manner, for a given document and a given phrase, the related phrase information can be used to score the document. The value of the bit vector itself (as a value) may be used as the document score. In this manner documents that contain high order related phrases of a query phrase are more likely to be topically related to the query than those that have low ordered related phrases. The bit vector value may also be used as a component in a more complex scoring function, and additionally may be weighted. The documents can then be ranked according to their document scores.

Phrase information may also be used in an information retrieval system to personalize searches for a user. A user is modeled as a collection of phrases, for example, derived from documents that the user has accessed (e.g., viewed on screen, printed, stored, etc.). More particularly, given a document accessed by user, the related phrases that are present in this document, are included in a user model or profile. During subsequent searches, the phrases in the user model are used to filter the phrases of the search query and to weight the document scores of the retrieved documents.

Phrase information may also be used in an information retrieval system to create a description of a document, for example the documents included in a set of search results. Given a search query, the system identifies the phrases present in the query, along with their related phrases, and their phrase extensions. For a given document, each sentence of the document has a count of how many of the query phrases, related phrases, and phrase extensions are present in the sentence. The sentences of document can be ranked by these counts (individually or in combination), and some number of the top ranking sentences (e.g., five sentences) are selected to form the document description. The document description can then be presented to the user when the document is included in search results, so that the user obtains a better understanding of the document, relative to the query.

A further refinement of this process of generating document descriptions allows the system to provide personalized descriptions, that reflect the interests of the user. As before, a user model stores information identifying related phrases that are of interest to the user. This user model is intersected with a list of phrases related to the query phrases, to identify phrases common to both groups. The common set is then ordered according to the related phrase information. The resulting set of related phrases is then used to rank the sentences of a document according to the number of instances of these related phrases present in each document. A number of sentences having the highest number of common related phrases is selected as the personalized document description.

An information retrieval system may also use the phrase information to identify and eliminate duplicate documents, either while indexing (crawling) the document collection, or when processing a search query. For a given document, each sentence of the document has a count of how many related phrases are present in the sentence. The sentences of document can be ranked by this count, and a number of the top ranking sentences (e.g., five sentences) are selected to form a document description. This description is then stored in association with the document, for example as a string or a hash of the sentences. During indexing, a newly crawled document is processed in the same manner to generate the document description. The new document description can be matched (e.g., hashed) against previous document descriptions, and if a match is found, then the new document is a duplicate. Similarly, during preparation of the results of a search query, the documents in the search result set can be processed to eliminate duplicates.

The present invention has further embodiments in system and software architectures, computer program products and computer implemented methods, and computer generated user interfaces and presentations.

The foregoing are just some of the features of an information retrieval system and methodology based on phrases. Those of skill in the art of information retrieval will appreciate the flexibility of generality of the phrase information allows for a large variety of uses and applications in indexing, document annotation, searching, ranking, and other areas of document analysis and processing.

BRIEF DESCRIPTION OF THE DRAWINGS

FIG. 3 illustrates a document with a phrase window and a secondary window.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

I. System Overview

Figure 1:
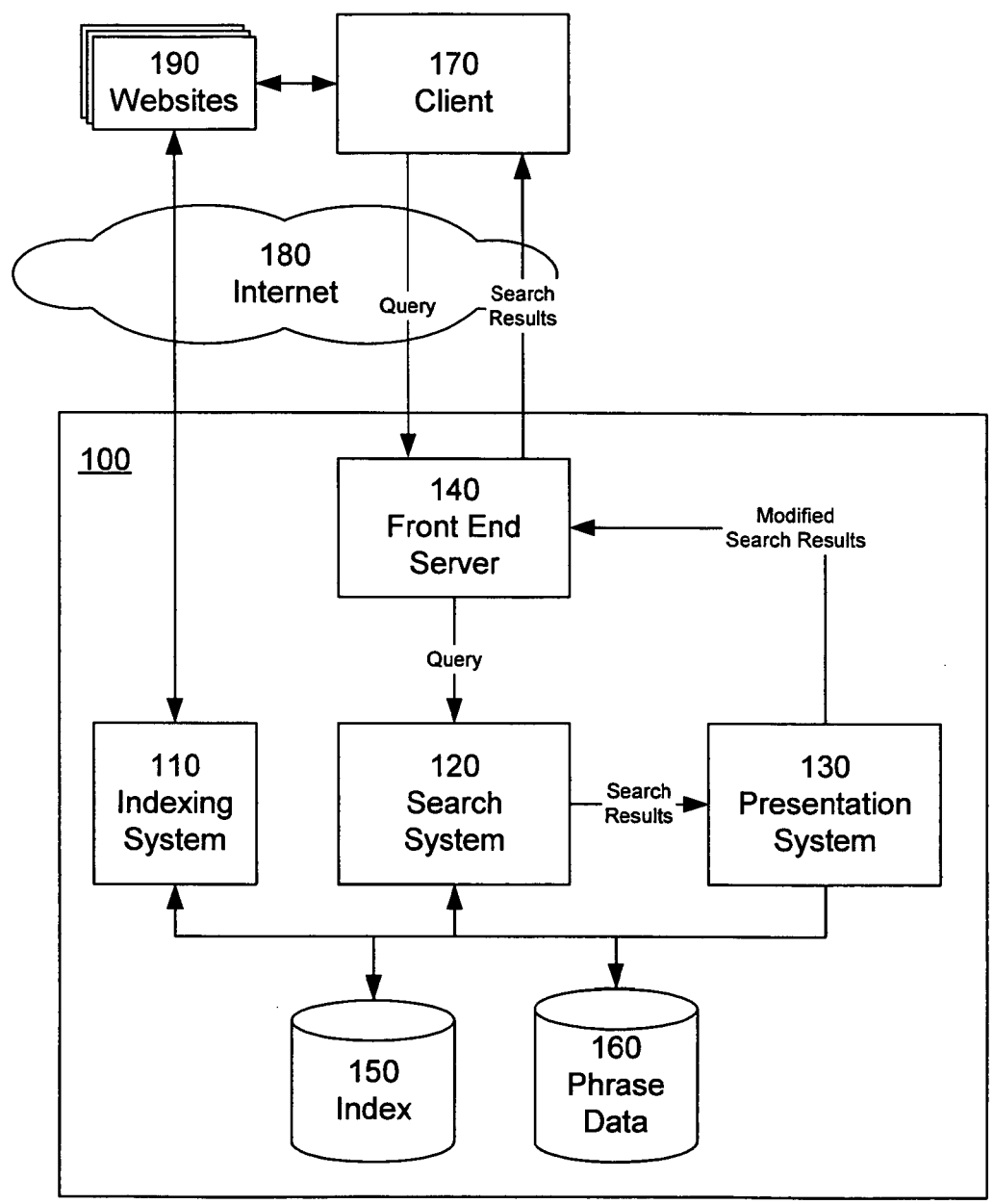
FIG. 1 is block diagram of the software architecture of one embodiment of the present invention.

Referring now to FIG. 1, there is shown the software architecture of an embodiment of a search system 100 in accordance with one embodiment of present invention. In this embodiment, the system includes a indexing system 110, a search system 120, a presentation system 130, and a front end server 140.

The indexing system 110 is responsible for identifying phrases in documents, and indexing documents according to their phrases, by accessing various websites 190 and other document collections. The front end server 140 receives queries from a user of a client 170, and provides those queries to the search system 120. The search system 120 is responsible for searching for documents relevant to the search query (search results), including identifying any phrases in the search query, and then ranking the documents in the search results using the presence of phrases to influence the ranking order. The search system 120 provides the search results to the presentation system 130. The presentation system 130 is responsible for modifying the search results including removing near duplicate documents, and generating topical descriptions of documents, and providing the modified search results back to the front end server 140, which provides the results to the client 170. The system 100 further includes an index 150 that stores the indexing information pertaining to documents, and a phrase data store 160 that stores phrases, and related statistical information.

In the context of this application, "documents" are understood to be any type of media that can be indexed and retrieved by a search engine, including web documents, images, multimedia files, text documents, PDFs or other image formatted files, and so forth. A document may have one or more pages, partitions, segments or other components, as appropriate to its content and type. Equivalently a document may be referred to as a "page," as commonly used to refer to documents on the Internet. No limitation as to the scope of the invention is implied by the use of the generic term "documents." The search system 100 operates over a large corpus of documents, such as the Internet and World Wide Web, but can likewise be used in more limited collections, such as for the document collections of a library or private enterprises. In either context, it will be appreciated that the documents are typically distributed across many different computer systems and sites. Without loss of generality then, the documents generally, regardless of format or location (e.g., which website or database) will be collectively referred to as a corpus or document collection. Each document has an associated identifier that uniquely identifies the document; the identifier is preferably a URL, but other types of identifiers (e.g., document numbers) may be used as well. In this disclosure, the use of URLs to identify documents is assumed.

II. Indexing System

In one embodiment, the indexing system 110 provides three primary functional operations: 1) identification of phrases and related phrases, 2) indexing of documents with respect to phrases, and 3) generation and maintenance of a phrase-based taxonomy. Those of skill in the art will appreciate that the indexing system 110 will perform other functions as well in support of conventional indexing functions, and thus these other operations are not further described herein. The indexing system 110 operates on an index 150 and data repository 160 of phrase data. These data repositories are further described below.

1. Phrase Identification

The phrase identification operation of the indexing system 110 identifies "good" and "bad" phrases in the document collection that are useful to indexing and searching documents. In one aspect, good phrases are phrases that tend to occur in more than certain percentage of documents in the document collection, and/or are indicated as having a distinguished appearance in such documents, such as delimited by markup tags or other morphological, format, or grammatical markers. Another aspect of good phrases is that they are predictive of other good phrases, and are not merely sequences of words that appear in the lexicon. For example, the phrase "President of the United States" is a phrase that predicts other phrases such as "George Bush" and "Bill Clinton." However, other phrases are not predictive, such as "fell down the stairs" or "top of the morning," "out of the blue," since idioms and colloquisms like these tend to appear with many other different and unrelated phrases. Thus, the phrase identification phase determines which phrases are good phrases and which are bad (i.e., lacking in predictive power).

Figure 2:
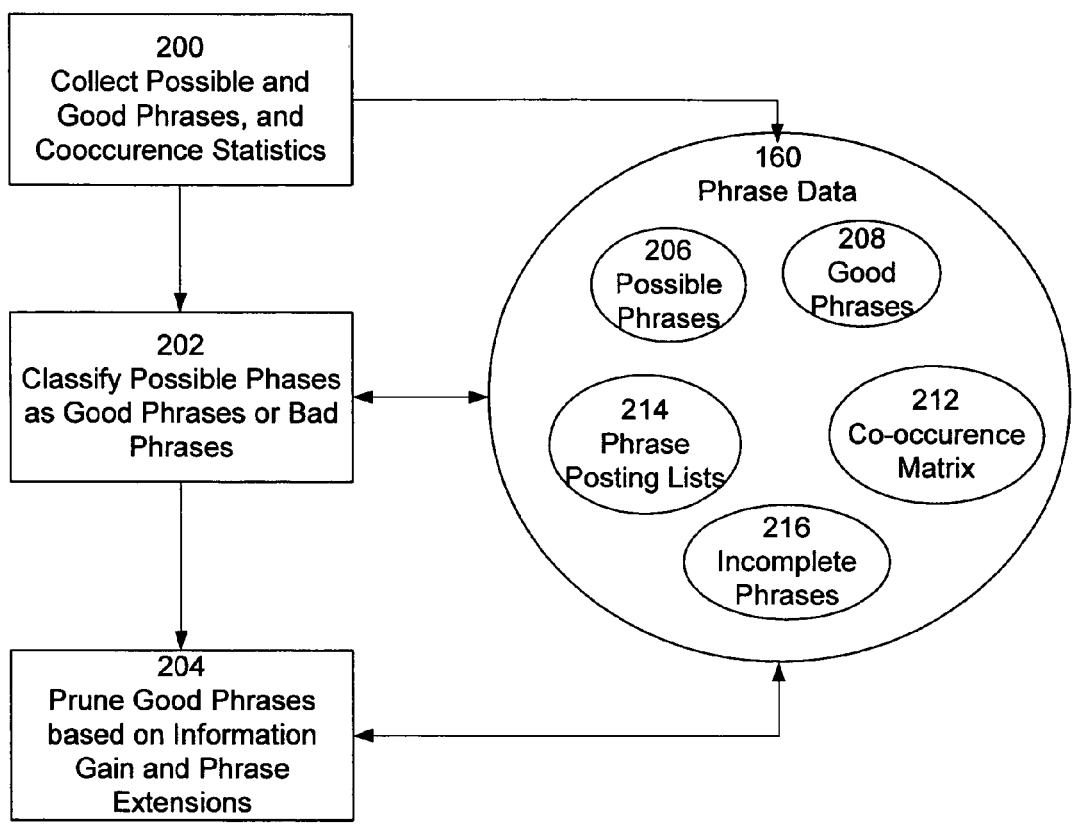
FIG. 2 illustrates a method of identifying phrases in documents.

Referring to now FIG. 2, the phrase identification process has the following functional stages:

200: Collect possible and good phrases, along with frequency and co-occurrence statistics of the phrases.

202: Classify possible phrases to either good or bad phrases based on frequency statistics.

204: Prune good phrase list based on a predictive measure derived from the co-occurrence statistics.

Each of these stages will now be described in further detail.

The first stage 200 is a process by which the indexing system 110 crawls a set of documents in the document collection, making repeated partitions of the document collection over time. One partition is processed per pass. The number of documents crawled per pass can vary, and is preferably about 1,000,000 per partition. It is preferred that only previously uncrawled documents are processed in each partition, until all documents have been processed, or some other termination criteria is met. In practice, the crawling continues as new documents are being continually added to the document collection. The following steps are taken by the indexing system 110 for each document that is crawled.

Traverse the words of the document with a phrase window length of n, where n is a desired maximum phrase length. The length of the window will typically be at least 2, and preferably 4 or 5 terms (words). Preferably phrases include all words in the phrase window, including what would otherwise be characterized as stop words, such as "a", "the," and so forth. A phrase window may be terminated by an end of line, a paragraph return, a markup tag, or other indicia of a change in content or format.

FIG. 3 illustrates a portion of a document 300 during a traversal, showing the phrase window 302 starting at the word "stock" and extending 5 words to the right. The first word in the window 302 is candidate phrase i, and the each of the sequences i+1, i+2, i+3, i+4, and i+5 is likewise a candidate phrase. Thus, in this example, the candidate phrases are: "stock", "stock dogs", "stock dogs for", "stock dogs for the", "stock dogs for the Basque", and "stock dogs for the Basque shepherds".

In each phrase window 302, each candidate phrase is checked in turn to determine if it is already present in the good phrase list 208 or the possible phrase list 206. If the candidate phrase is not present in either the good phrase list 208 or the possible phrase list 206, then the candidate has already been determined to be "bad" and is skipped.

If the candidate phrase is in the good phrase list 208, as entry then the index 150 entry for phrase $g_j$ is updated to include the document (e.g., its URL or other document identifier), to indicate that this candidate phrase $g_j$ appears in the current document. An entry in the index 150 for a phrase $g_j$ (or a term) is referred to as the posting list of the phrase $g_j$. The posting list includes a list of documents d (by their document identifiers, e.g. a document number, or alternatively a URL) in which the phrase occurs.

In addition, the co-occurrence matrix 212 is updated, as further explained below. In the very first pass, the good and bad lists will be empty, and thus, most phrases will tend to be added to the possible phrase list 206.

If the candidate phrase is not in the good phrase list 208 then it is added to the possible phrase list 206, unless it is already present therein. Each entry p on the possible phrase list 206 has three associated counts:

P(p): Number of documents on which the possible phrase appears;

S(p): Number of all instances of the possible phrase; and

M(p): Number of interesting instances of the possible phrase. An instance of a possible phrase is "interesting" where the possible phrase is distinguished from neighboring content in the document by grammatical or format markers, for example by being in boldface, or underline, or as anchor text in a hyperlink, or in quotation marks. These (and other) distinguishing appearances are indicated by various HTML markup language tags and grammatical markers. These statistics are maintained for a phrase when it is placed on the good phrase list 208.

In addition the various lists, a co-occurrence matrix 212 (G) for the good phrases is maintained. The matrix G has a dimension of m×m, where m is the number of good phrases. Each entry G(j,k) in the matrix represents a pair of good phrases ($g_j$, $g_k$). The co-occurrence matrix 212 logically (though not necessarily physically) maintains three separate counts for each pair ($g_j$, $g_k$) of good phrases with respect to a secondary window 304 that is centered at the current word i, and extends +/−h words. In one embodiment, such as illustrated in FIG. 3, the secondary window 304 is 30 words. The co-occurrence matrix 212 thus maintains:

R(j,k): Raw Co-occurrence count. The number of times that phrase $g_j$ appears in a secondary window 304 with phrase $g_k$;

D(j,k): Disjunctive Interesting count. The number of times that either phrase $g_j$ or phrase $g_k$ appears as distinguished text in a secondary window; and C(j,k): Conjunctive Interesting count: the number of times that both $g_j$ and phrase $g_k$ appear as distinguished text in a secondary window. The use of the conjunctive interesting count is particularly beneficial to avoid the circumstance where a phrase (e.g., a copyright notice) appears frequently in sidebars, footers, or headers, and thus is not actually predictive of other text.

Referring to the example of FIG. 3, assume that the "stock dogs" is on the good phrase list 208, as well as the phrases "Australian Shepherd" and "Australian Shepard Club of America". Both of these latter phrases appear within the secondary window 304 around the current phrase "stock dogs". However, the phrase "Australian Shepherd Club of America" appears as anchor text for a hyperlink (indicated by the underline) to website. Thus the raw co-occurrence count for the pair {"stock dogs", "Australian Shepherd"} is incremented, and the raw occurrence count and the disjunctive interesting count for {"stock dogs", "Australian Shepherd Club of America"} are both incremented because the latter appears as distinguished text.

The process of traversing each document with both the sequence window 302 and the secondary window 304, is repeated for each document in the partition.

Once the documents in the partition have been traversed, the next stage of the indexing operation is to update 202 the good phrase list 208 from the possible phrase list 206. A possible phrase p on the possible phrase list 206 is moved to the good phrase list 208 if the frequency of appearance of the phrase and the number of documents that the phrase appears in indicates that it has sufficient usage as semantically meaningful phrase.

In one embodiment, this is tested as follows. A possible phrase p is removed from the possible phrase list 206 and placed on the good phrase list 208 if:

a) P(p)>10 and S(p)>20 (the number of documents containing phrase p is more than 10, and the number of occurrences of phrase p is more then 20); or b) M(p)>5 (the number of interesting instances of phrase p is more than 5).

These thresholds are scaled by the number of documents in the partition; for example if 2,000,000 documents are crawled in a partition, then the thresholds are approximately doubled. Of course, those of skill in the art will appreciate that the specific values of the thresholds, or the logic of testing them, can be varied as desired.

If a phrase p does not qualify for the good phrase list 208, then it is checked for qualification for being a bad phrase. A phrase p is a bad phrase if:

a) number of documents containing phrase, P(p)<2; and b) number of interesting instances of phrase, M(p)=0.

These conditions indicate that the phrase is both infrequent, and not used as indicative of significant content and again these thresholds may be scaled per number of documents in the partition.

It should be noted that the good phrase list 208 will naturally include individual words as phrases, in addition to multi-word phrases, as described above. This is because each the first word in the phrase window 302 is always a candidate phrase, and the appropriate instance counts will be accumulated. Thus, the indexing system 110 can automatically index both individual words (i.e., phrases with a single word) and multiple word phrases. The good phrase list 208 will also be considerably shorter than the theoretical maximum based on all possible combinations of m phrases. In typical embodiment, the good phrase list 208 will include about $6.5 \times 10^5$ phrases. A list of bad phrases is not necessary to store, as the system need only keep track of possible and good phrases.

By the final pass through the document collection, the list of possible phrases will be relatively short, due to the expected distribution of the use of phrases in a large corpus. Thus, if say by the $10^{th}$ pass (e.g., 10,000,000 documents), a phrase appears for the very first time, it is very unlikely to be a good phrase at that time. It may be new phrase just coming into usage, and thus during subsequent crawls becomes increasingly common. In that case, its respective counts will increases and may ultimately satisfy the thresholds for being a good phrase.

The third stage of the indexing operation is to prune 204 the good phrase list 208 using a predictive measure derived from the co-occurrence matrix 212. Without pruning, the good phrase list 208 is likely to include many phrases that while legitimately appearing in the lexicon, themselves do not sufficiently predict the presence of other phrases, or themselves are subsequences of longer phrases. Removing these weak good phrases results in a very robust likely of good phrases. To identify good phrases, a predictive measure is used which expresses the increased likelihood of one phrase appearing in a document given the presence of another phrase. This is done, in one embodiment, as follows:

As noted above, the co-occurrence matrix 212 is an m×m matrix of storing data associated with the good phrases. Each row j in the matrix represents a good phrase $g_j$ and each column k represented a good phrase $g_k$. For each good phrase an expected value $E(g_j)$ is computed. The expected value E is the percentage of documents in the collection expected to contain $g_j$. This is computed, for example, as the ratio of the number of documents containing $g_j$ to the total number T of documents in the collection that have been crawled: P(j)/T.

As noted above, the number of documents containing $g_j$ is updated each time $g_j$ appears in a document. The value for $E(g_j)$ can be updated each time the counts for $g_j$ are incremented, or during this third stage.

Next, for each other good phrase $g_k$ (e.g., the columns of the matrix), it is determined whether $g_j$ predicts $g_k$. A predictive measure for $g_j$ is determined as follows:

i) compute the expected value $E(g_k)$. The expected co-occurrence rate E(j,k) of $g_j$ and $g_k$, if they were unrelated phrases is then $E(g_j)*E(g_k)$;

ii) compute the actual co-occurrence rate A(j,k) of $g_j$ and $g_k$. This is the raw co-occurrence count R(j,k) divided by T, the total number of documents;

iii) $g_j$ is said to predict $g_k$ where the actual co-occurrence rate A(j,k) exceeds the expected co-occurrence rate E(j,k) by a threshold amount.

In one embodiment, the predictive measure is information gain. Thus, a phrase $g_j$ predicts another phrase $g_k$ when the information gain I of $g_k$ in the presence of $g_j$ exceeds a threshold. In one embodiment, this is computed as follows:

$$I(j,k)=A(j,k)/E(j,k)$$

And good phrase $g_j$ predicts good phrase $g_k$ where:

$$I(j,k) > \text{Information Gain threshold.}$$

In one embodiment, the information gain threshold is 1.5, but is preferably between 1.1 and 1.7. Raising the threshold over 1.0 serves to reduce the possibility that two otherwise unrelated phrases co-occur more than randomly predicted.

As noted the computation of information gain is repeated for each column k of the matrix G with respect to a given row j. Once a row is complete, if the information gain for none of the good phrases $g_k$ exceeds the information gain threshold, then this means that phrase $g_j$ does not predict any other good phrase. In that case, $g_j$ is removed from the good phrase list 208, essentially becoming a bad phrase. Note that the column j for the phrase $g_j$ is not removed, as this phrase itself may be predicted by other good phrases.

This step is concluded when all rows of the co-occurrence matrix 212 have been evaluated.

The final step of this stage is to prune the good phrase list 208 to remove incomplete phrases. An incomplete phrase is a phrase that only predicts its phrase extensions, and which starts at the left most side of the phrase (i.e., the beginning of the phrase). The "phrase extension" of phrase p is a supersequence that begins with phrase p. For example, the phrase "President of" predicts "President of the United States", "President of Mexico", "President of AT&T", etc. All of these latter phrases are phrase extensions of the phrase "President of" since they begin with "President of" and are super-sequences thereof.

Accordingly, each phrase $g_j$ remaining on the good phrase list 208 will predict some number of other phrases, based on the information gain threshold previously discussed. Now, for each phrase $g_j$ the indexing system 110 performs a string match with each of the phrases $g_k$ that it predicts. The string match tests whether each predicted phrase $g_k$ is a phrase extension of the phrase $g_j$. If all of the predicted phrases $g_k$ are phrase extensions of phrase $g_j$, then phrase $g_j$ is incomplete, and is removed from the good phrase list 208, and added to an incomplete phrase list 216. Thus, if there is at least one phrase $g_k$ that is not an extension of then $g_j$ is complete, and maintained in the good phrase list 208. For example then, "President of the United" is an incomplete phrase because the only other phrase that it predicts is "President of the United States" which is an extension of the phrase.

The incomplete phrase list 216 itself is very useful during actual searching. When a search query is received, it can be compared against the incomplete phase list 216. If the query (or a portion thereof) matches an entry in the list, then the search system 120 can lookup the most likely phrase extensions of the incomplete phrase (the phrase extension having the highest information gain given the incomplete phrase), and suggest this phrase extension to the user, or automatically search on the phrase extension. For example, if the search query is "President of the United," the search system 120 can automatically suggest to the user "President of the United States" as the search query.

After the last stage of the indexing process is completed, the good phrase list 208 will contain a large number of good phrases that have been discovered in the corpus. Each of these good phrases will predict at least one other phrase that is not a phrase extension of it. That is, each good phrase is used with sufficient frequency and independence to represent meaningful concepts or ideas expressed in the corpus. Unlike existing systems which use predetermined or hand selected phrases, the good phrase list reflects phrases that actual are being used in the corpus. Further, since the above process of crawling and indexing is repeated periodically as new documents are added to the document collection, the indexing system 110 automatically detects new phrases as they enter the lexicon.

2. Identification of Related Phrases and Clusters of Related Phrases

Figure 4:
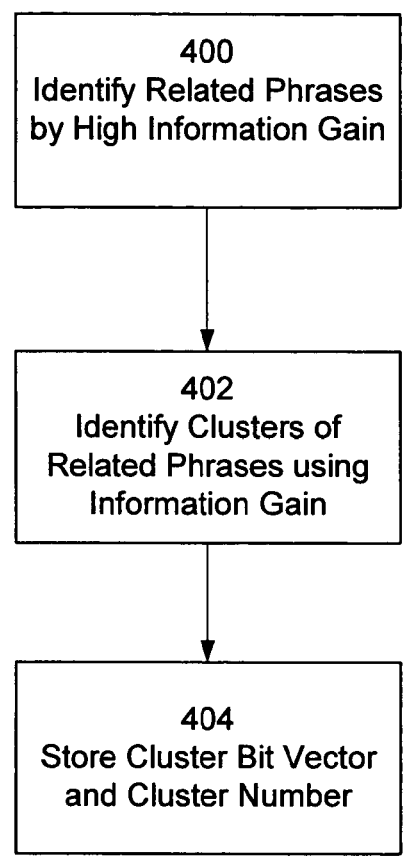
FIG. 4 illustrates a method of identifying related phrases.

Referring to FIG. 4, the related phrase identification process includes the following functional operations.

400: Identify related phrases having a high information gain value.

402: Identify clusters of related phrases.

404: Store cluster bit vector and cluster number.

Each of these operations is now described in detail.

First, recall that the co-occurrence matrix 212 contains good phrases each of which predicts at least one other good phrase $g_k$ with an information gain greater than the information gain threshold. To identify 400 related phrases then, for each pair of good phrases ($g_j$, $g_k$) the information gain is compared with a Related Phrase threshold, e.g., 100. That is, $g_j$ and $g_k$ are related phrases where:

$$I(g_j, g_k) > 100.$$

This high threshold is used to identify the co-occurrences of good phrases that are well beyond the statistically expected rates. Statistically, it means that phrases $g_j$ and $g_k$ co-occur 100 times more than the expected co-occurrence rate. For example, given the phrase "Monica Lewinsky" in a document, the phrase "Bill Clinton" is a 100 times more likely to appear in the same document, then the phrase "Bill Clinton" is likely to appear on any randomly selected document. Another way of saying this is that the accuracy of the predication is 99.999% because the occurrence rate is 100:1.

Accordingly, any entry ($g_j$, $g_k$) that is less than the Related Phrase threshold is zeroed out, indicating that the phrases $g_j$, $g_k$ are not related. Any remaining entries in the co-occurrence matrix 212 now indicate all related phrases.

The columns $g_k$ in each row $g_j$ of the co-occurrence matrix 212 are then sorted by the information gain values $I(g_j, g_k)$, so that the related phrase $g_k$ with the highest information gain is listed first. This sorting thus identifies for a given phrase which other phrases are most likely related in terms of information gain.

The next step is to determine 402 which related phrases together form a cluster of related phrases. A cluster is a set of related phrases in which each phrase has high information gain with respect to at least one other phrase. In one embodiment, clusters are identified as follows.

In each row $g_j$ of the matrix, there will be one or more other phrases that are related to phrase $g_j$. This set is related phrase set $R_j$, where $R=\{g_k, g_l, \ldots g_m\}$.

For each related phrase m in the indexing system 110 determines if each of the other related phrases in R is also related to $g_j$. Thus, if $I(g_k, g_l)$ is also non-zero, then $g_j$, $g_k$, and $g_l$ are part of a cluster. This cluster test is repeated for each pair ($g_l$, $g_m$) in R.

For example, assume the good phrase "Bill Clinton" is related to the phrases "President", "Monica Lewinsky", because the information gain of each of these phrases with respect to "Bill Clinton" exceeds the Related Phrase threshold. Further assume that the phrase "Monica Lewinsky" is related to the phrase "purse designer". These phrases then form the set R. To determine the clusters, the indexing system 110 evaluates the information gain of each of these phrases to the others by determining their corresponding information gains. Thus, the indexing system 110 determines the information gain I("President", "Monica Lewinsky"), I("President", "purse designer"), and so forth, for all pairs in R. In this example, "Bill Clinton," "President", and "Monica Lewinsky" form a one cluster, "Bill Clinton," and "President" form a second cluster, and "Monica Lewinsky" and "purse designer" form a third cluster, and "Monica Lewinsky", "Bill Clinton," and "purse designer" form a fourth cluster. This is because while "Bill Clinton" does not predict "purse designer" with sufficient information gain, "Monica Lewinsky" does predict both of these phrases.

To record 404 the cluster information, each cluster is assigned a unique cluster number (cluster ID). This information is then recorded in conjunction with each good phrase $g_j$.

In one embodiment, the cluster number is determined by a cluster bit vector that also indicates the orthogonality relationships between the phrases. The cluster bit vector is a sequence of bits of length n, the number of good phrases in the good phrase list 208. For a given good phrase the bit positions correspond to the sorted related phrases R of $g_j$. A bit is set if the related phrase $g_k$ in R is in the same cluster as phrase $g_j$. More generally, this means that the corresponding bit in the cluster bit vector is set if there is information gain in either direction between $g_j$ and $g_k$.

The cluster number then is the value of the bit string that results. This implementation has the property that related phrases that have multiple or one-way information gain appear in the same cluster.

An example of the cluster bit vectors are as follows, using the above phrases:

|  | Bill Clinton | President | Monica Lewinsky | purse designer | Cluster ID |
|---|---|---|---|---|---|
| Bill Clinton | 1 | 1 | 1 | 0 | 14 |
| President | 1 | 1 | 0 | 0 | 12 |
| Monica Lewinsky | 1 | 0 | 1 | 1 | 11 |
| purse designer | 0 | 0 | 1 | 1 | 3 |

To summarize then, after this process there will be identified for each good phrase $g_j$, a set of related phrases R, which are sorted in order of information gain $I(g_j, g_k)$ from highest to lowest. In addition, for each good phrase $g_j$, there will be a cluster bit vector, the value of which is a cluster number identifying the primary cluster of which the phrase $g_j$ is a member, and the orthogonality values (1 or 0 for each bit position) indicating which of the related phrases in R are in common clusters with Thus in the above example, "Bill Clinton", "President", and "Monica Lewinsky" are in cluster 14 based on the values of the bits in the row for phrase "Bill Clinton".

To store this information, two basic representations are available. First, as indicated above, the information may be stored in the co-occurrence matrix 212, wherein:

entry $G[\text{row } j, \text{col. } k] = (I(j,k), \text{clusterNumber}, \text{clusterBitVector})$ Alternatively, the matrix representation can be avoided, and all information stored in the good phrase list 208, wherein each row therein represents a good phrase $g_j$;

Phrase row$_j$=list[phrase $g_k$, $(I(j,k)$, clusterNumber, clusterBitVector)].

This approach provides a useful organization for clusters. First, rather than a strictly—and often arbitrarily—defined hierarchy of topics and concepts, this approach recognizes that topics, as indicated by related phrases, form a complex graph of relationships, where some phrases are related to many other phrases, and some phrases have a more limited scope, and where the relationships can be mutual (each phrase predicts the other phrase) or one-directional (one phrase predicts the other, but not vice versa). The result is that clusters can be characterized "local" to each good phrase, and some clusters will then overlap by having one or more common related phrases.

For a given good phrase $g_j$ then the ordering of the related phrases by information gain provides a taxonomy for naming the clusters of the phrase: the cluster name is the name of the related phrase in the cluster having the highest information gain.

The above process provides a very robust way of identifying significant phrases that appear in the document collection, and beneficially, the way these related phrases are used together in natural "clusters" in actual practice. As a result, this data-driven clustering of related phrases avoids the biases that are inherent in any manually directed "editorial" selection of related terms and concepts, as is common in many systems.

3. Indexing Documents with Phrases and Related Phrases

Figure 5:
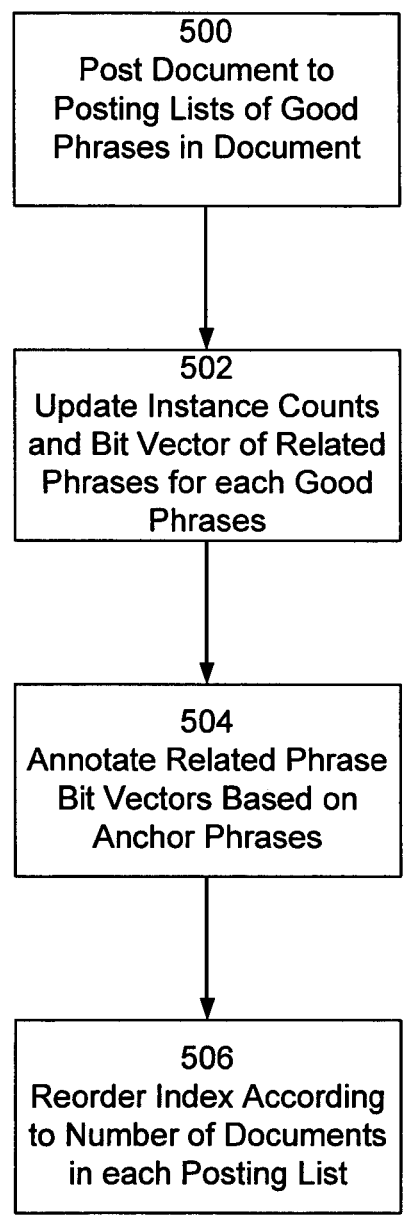
FIG. 5 illustrates a method of indexing documents for related phrases.

Given the good phrase list 208, including the information pertaining to related phrases and clusters, the next functional operation of the indexing system 110 is to index documents in the document collection with respect to the good phrases and clusters, and store the updated information in the index 150. FIG. 5 illustrates this process, in which there are the following functional stages for indexing a document:

500: Post document to the posting lists of good phrases found in the document.

502: Update instance counts and related phrase bit vector for related phases and secondary related phrases.

504: Annotate documents with related phrase information.

506: Reorder index entries according to posting list size.

These stages are now described in further detail.

A set of documents is traversed or crawled, as before; this may be the same or a different set of documents. For a given document d, traverse 500 the document word by word with a sequence window 302 of length n, from position i, in the manner described above.

In a given phrase window 302, identify all good phrases in the window, starting at position i. Each good phrase is denoted as $g_i$. Thus, g1 is the first good phrase, g2 would be the second good phrase, and so forth.

For each good phrase $g_j$ (example g1 "President" and g4 "President of ATT") post the document identifier (e.g., the URL) to the posting list for the good phrase $g_i$ in the index 150. This update identifies that the good phrase $g_i$ appears in this specific document.

In one embodiment, the posting list for a phrase $g_j$ takes the following logical form:

Phrase $g_j$: list: (document d, [list: related phase counts] [related phrase information])

For each phrase $g_j$ there is a list of the documents d on which the phrase appears. For each document, there is a list of counts of the number of occurrences of the related phrases R of phrase $g_j$ that also appear in document d.

In one embodiment, the related phrase information is a related phase bit vector. This bit vector may be characterized as a "bi-bit" vector, in that for each related phrase $g_k$ there are two bit positions, $g_k$-1, $g_k$-2. The first bit position stores a flag indicating whether the related phrase $g_k$ is present in the document d (i.e., the count for $g_k$ in document d is greater than 0). The second bit position stores a flag that indicates whether a related phrase $g_l$ of $g_k$ is also present in document d. The related phrases $g_l$ of a related phrase $g_k$ of a phrase $g_j$ are herein called the "secondary related phrases of $g_j$." The counts and bit positions correspond to the canonical order of the phrases in R (sorted in order of decreasing information gain). This sort order has the effect of making the related phrase $g_k$ that is most highly predicted by $g_j$ associated with the most significant bit of the related phrase bit vector, and the related phrase $g_l$ that is least predicted by $g_j$ associated with the least significant bit.

It is useful to note that for a given phrase g, the length of the related phrase bit vector, and the association of the related phrases to the individual bits of the vector, will be the same with respect to all documents containing g. This implementation has the property of allowing the system to readily compare the related phrase bit vectors for any (or all) documents containing g, to see which documents have a given related phrase. This is beneficial for facilitating the search process to identify documents in response to a search query. Accordingly, a given document will appear in the posting lists of many different phrases, and in each such posting list, the related phrase vector for that document will be specific to the phrase that owns the posting list. This aspect preserves the locality of the related phrase bit vectors with respect to individual phrases and documents.

Accordingly, the next stage 502 includes traversing the secondary window 304 of the current index position in the document (as before a secondary window of +/−K terms, for example, 30 terms), for example from i−K to i+K. For each related phrase $g_k$ of $g_i$ that appears in the secondary window 304, the indexing system 110 increments the count of $g_k$ with respect to document d in the related phrase count. If $g_i$ appears later in the document, and the related phrase is found again within the later secondary window, again the count is incremented.

As noted, the corresponding first bit $g_k$-1 in the related phrase bit map is set based on the count, with the bit set to 1 if the count for $g_k$ is >0, or set to 0 if the count equals 0.

Next, the second bit, $g_k$-2 is set by looking up related phrase $g_k$ in the index 150, identifying in $g_k$'s posting list the entry for document d, and then checking the secondary related phrase counts (or bits) for $g_k$ for any its related phrases. If any of these secondary related phrases counts/bits are set, then this indicates that the secondary related phrases of $g_j$ are also present in document d.

When document d has been completely processed in this manner, the indexing system 110 will have identified the following:

i) each good phrase $g_j$ in document d;

ii) for each good phrase $g_j$ which of its related phrases $g_k$ are present in document d;

iii) for each related phrase $g_k$ present in document d, which of its related phrases $g_l$ (the secondary related phrases of $g_j$) are also present in document d.

a) Determining the Topics for a Document

The indexing of documents by phrases and use of the clustering information provides yet another advantage of the indexing system 110, which is the ability to determine the topics that a document is about based on the related phrase information.

Assume that for a given good phrase $g_j$ and a given document d, the posting list entry is as follows:

$g_j$: document d: related phrase counts:={3, 4, 3, 0, 0, 2, 1, 1, 0} related phrase bit vector:={11 11 10 00 00 10 10 10 01} where, the related phrase bit vector is shown in the bi-bit pairs.

From the related phrase bit vector, we can determine primary and secondary topics for the document d. A primary topic is indicated by a bit pair (1,1), and a secondary topic is indicated by a bit pair (1,0). A related phrase bit pair of (1,1) indicates that both the related phrase $g_k$ for the bit pair is present in document d, along the secondary related phrases $g_j$ as well. This may be interpreted to mean that the author of the document d used several related phrases $g_j$, $g_k$, and $g_l$ together in drafting the document. A bit pair of (1,0) indicates that both $g_j$ and $g_k$ are present, but no further secondary related phrases from $g_k$ are present, and thus this is a less significant topic.

b) Document Annotation for Improved Ranking

A further aspect of the indexing system 110 is the ability to annotate 504 each document d during the indexing process with information that provides for improved ranking during subsequent searches. The annotation process 506 is as follows.

A given document d in the document collection may have some number of outlinks to other documents. Each outlink (a hyperlink) includes anchor text and the document identifier of the target document. For purposes of explanation, a current document d being processed will be referred to as URL0, and the target document of an outlink on document d will be referred to as URL1. For later use in ranking documents in search results, for every link in URL0, which points to some other URLi, the indexing system 110 creates an outlink score for the anchor phrase of that link with respect to URL0, and an inlink score for that anchor phrase with respect to URLi. That is, each link in the document collection has a pair of scores, an outlink score and an inlink score. These scores are computed as follows.

Figure 8A:
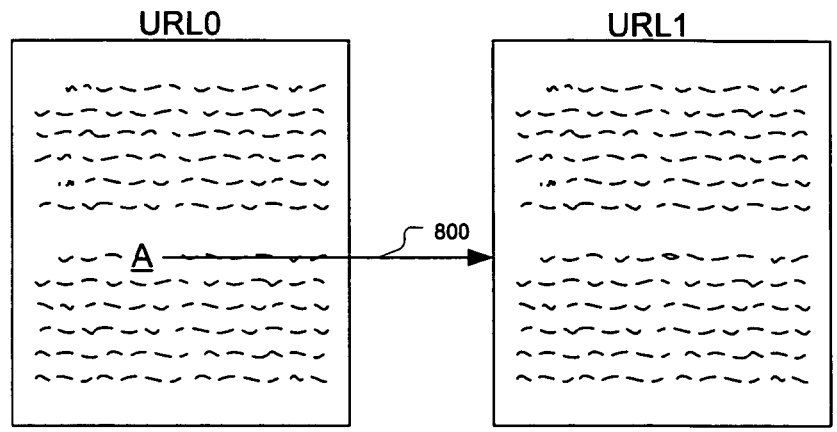
FIGS. 8a and 8b illustrate relationships between referencing and referenced documents.

On a given document URL0, the indexing system 110 identifies each outlink to another document URL1, in which the anchor text A is a phrase in the good phrase list 208. FIG. 8a illustrates schematically this relationship, in which anchor text "A" in document URL0 is used in a hyperlink 800.

In the posting list for phrase A, URL0 is posted as an outlink of phrase A, and URL1 is posted as an inlink of phrase A. For URL0, the related phrase bit vector is completed as described above, to identify the related phrases and secondary related phrases of A present in URL0. This related phrase bit vector is used as the outlink score for the link from URL0 to URL1 containing anchor phrase A.

Figure 8B:
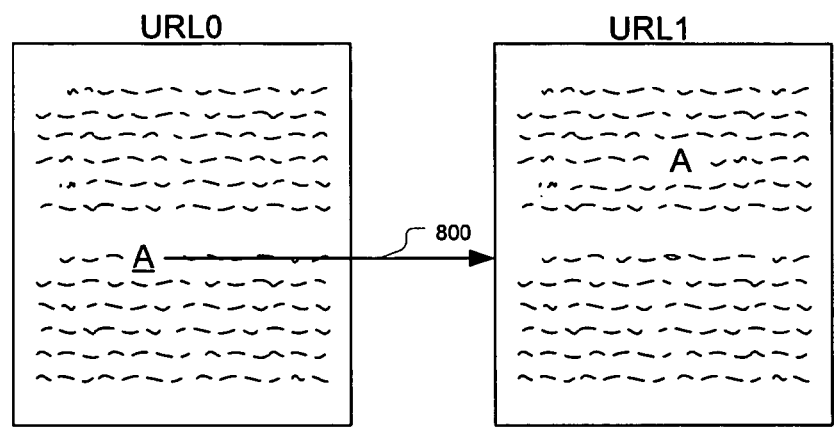

Next, the inlink score is determined as follow. For each inlink to URL1 containing the anchor phrase A, the indexing system 110 scans URL1, and determines whether phrase A appears in the body of URL1. If phrase A not only points to URL1 (via a outlink on URL0), but also appears in the content of URL1 itself, this suggests that URL1 can be said to be intentionally related to the concept represented by phrase A. FIG. 8b illustrates this case, where phrase A appears in both URL0 (as anchor text) and in the body of URL1. In this case, the related phrase bit vector for phrase A for URL1 is used as the inlink score for the link from URL0 to URL1 containing phrase A.

If the anchor phrase A does not appear in the body of URL1 (as in FIG. 8a), then a different step is taken to determine the inlink score. In this case, the indexing system 110 creates a related phrase bit vector for URL1 for phrase A (as if phrase A was present in URL1) and indicating which of the related phrases of phrase A appear in URL1. This related phrase bit vector is then used as the inlink score for the link from URL0 to URL1.

For example, assume the following phrases are initially present in URL0 and URL1:

| Document | Anchor Phrase Australian Shepherd | Aussie | Related Phrase Bit Vector blue merle | red merle | tricolor | agility training |
|---|---|---|---|---|---|---|
| URL0 | 1 | 1 | 0 | 0 | 0 | 0 |
| URL1 | 1 | 0 | 1 | 1 | 1 | 0 |

(In the above, and following tables, the secondary related phrase bits are not shown). The URL0 row is the outlink score of the link from anchor text A, and the URL1 row is the inlink score of the link. Here, URL0 contains the anchor phrase "Australian Shepard" which targets URL1. Of the five related phrases of "Australian Shepard", only one, "Aussie" appears in URL0. Intuitively then, URL0 is only weakly about Australian Shepherds. URL1, by comparison, not only has the phrase "Australian Shepherd" present in the body of the document, but also has many of the related phrases present as well, "blue merle," "red merle," and "tricolor." Accordingly, because the anchor phrase "Australian Shepard" appears in both URL0 and URL1, the outlink score for URL0, and the inlink score for URL1 are the respective rows shown above.

The second case described above is where anchor phrase A does not appear in URL1. In that, the indexing system 110 scans URL1 and determines which of the related phrases "Aussie," "blue merle," "red merle," "tricolor," and "agility training" are present in URL1, and creates an related phrase bit vector accordingly, for example:

| Document | Anchor Phrase Australian Shepherd | Aussie | Related Phrase Bit Vector blue merle | red merle | tricolor | agility training |
|---|---|---|---|---|---|---|
| URL0 | 1 | 1 | 0 | 0 | 0 | 0 |
| URL1 | 0 | 0 | 1 | 1 | 1 | 0 |

Here, this shows that the URL1 does not contain the anchor phrase "Australian Shepard", but does contain the related phrases "blue merle", "red merle", and "tricolor".

This approach has the benefit of entirely preventing certain types of manipulations of web pages (a class of documents) in order to skew the results of a search. Search engines that use a ranking algorithm that relies on the number of links that point to a given document in order to rank that document can be "bombed" by artificially creating a large number of pages with a given anchor text which then point to a desired page. As a result, when a search query using the anchor text is entered, the desired page is typically returned, even if in fact this page has little or nothing to do with the anchor text. Importing the related bit vector from a target document URL1 into the phrase A related phrase bit vector for document URL0 eliminates the reliance of the search system on just the relationship of phrase A in URL0 pointing to URL1 as an indicator of significance or URL1 to the anchor text phrase.

Each phrase in the index 150 is also given a phrase number, based on its frequency of occurrence in the corpus. The more common the phrase, the lower phrase number it receives order in the index. The indexing system 110 then sorts 506 all of the posting lists in the index 150 in declining order according to the number of documents listed phrase number of in each posting list, so that the most frequently occurring phrases are listed first. The phrase number can then be used to look up a particular phrase.

III. Search System

Figure 6:
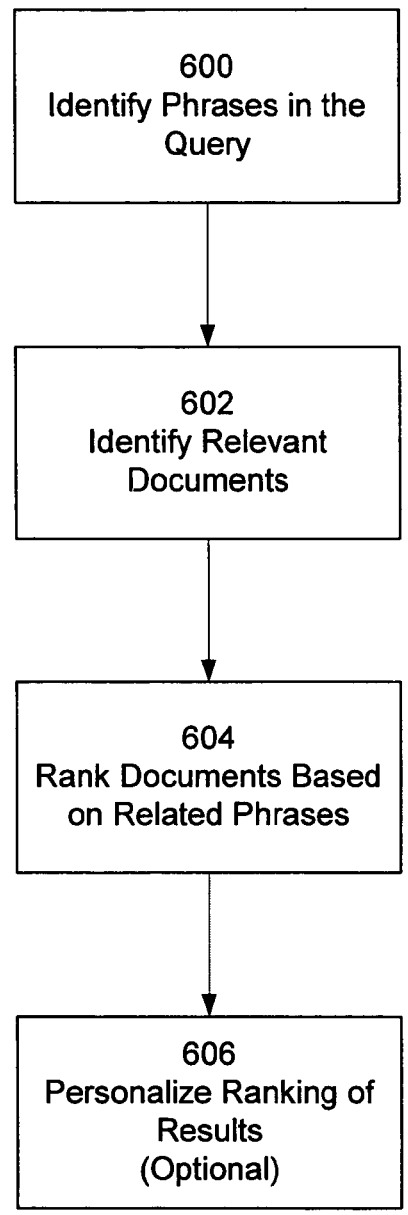
FIG. 6 illustrates a method of retrieving documents based on phrases.

The search system 120 operates to receive a query and search for documents relevant to the query, and provide a list of these documents (with links to the documents) in a set of search results. FIG. 6 illustrates the main functional operations of the search system 120:

600: Identify phrases in the query.
602: Retrieve documents relevant to query phrases.

604: Rank documents in search results according to phrases.

The details of each of these of these stages is as follows.

1. Identification of Phrases in the Query and Query Expansion

The first stage 600 of the search system 120 is to identify any phrases that are present in the query in order to effectively search the index. The following terminology is used in this section:

q: a query as input and receive by the search system 120.
Qp: phrases present in the query.
Qr: related phrases of Qp.
Qe: phrase extensions of Qp.
Q: the union of Qp and Qr.

A query q is received from a client 190, having up to some maximum number of characters or words.

A phrase window of size N (e.g., 5) is used by the search system 120 to traverse the terms of the query q. The phrase window starts with the first term of the query, extends N terms to the right. This window is then shifted right M-N times, where M is the number of terms in the query.

At each window position, there will be N terms (or fewer) terms in the window. These terms constitute a possible query phrase. The possible phrase is looked up in the good phrase list 208 to determine if it is a good phrase or not. If the possible phrase is present in the good phrase list 208, then a phrase number is returned for phrase; the possible phrase is now a candidate phrase.

After all possible phrases in each window have been tested to determine if they are good candidate phrases, the search system 120 will have a set of phrase numbers for the corresponding phrases in the query. These phrase numbers are then sorted (declining order).

Starting with the highest phrase number as the first candidate phrase, the search system 120 determines if there is another candidate phrase within a fixed numerical distance within the sorted list, i.e., the difference between the phrase numbers is within a threshold amount, e.g. 20,000. If so, then the phrase that is leftmost in the query is selected as a valid query phrase Qp. This query phrase and all of its sub-phrases is removed from the list of candidates, and the list is resorted and the process repeated. The result of this process is a set of valid query phrases Qp.

For example, assume the search query is "Hillary Rodham Clinton Bill on the Senate Floor". The search system 120 would identify the following candidate phrases, "Hillary Rodham Clinton Bill on," "Hillary Rodham Clinton Bill," and "Hillary Rodham Clinton". The first two are discarded, and the last one is kept as a valid query phrase. Next the search system 120 would identify "Bill on the Senate Floor", and the subsphrases "Bill on the Senate", "Bill on the", "Bill on", "Bill", and would select "Bill" as a valid query phrase Qp. Finally, the search system 120 would parse "on the senate floor" and identify "Senate Floor" as a valid query phrase.

Next, the search system 120 adjusts the valid phrases Qp for capitalization. When parsing the query, the search system 120 identifies potential capitalizations in each valid phrase. This may be done using a table of known capitalizations, such as "united states" being capitalized as "United States", or by using a grammar based capitalization algorithm. This produces a set of properly capitalized query phrases.

The search system 120 then makes a second pass through the capitalized phrases, and selects only those phrases are leftmost and capitalized where both a phrase and its sub-phrase is present in the set. For example, a search on "president of the united states" will be capitalized as "President of the United States".

In the next stage, the search system 120 identifies 602 the documents that are relevant to the query phrases Q. The search system 120 then retrieves the posting lists of the query phrases Q, and intersects these lists to determine which documents appear on the all (or some number) of the posting lists for the query phrases. If a phrase Q in the query has a set of phrase extensions Qe (as further explained below), then the search system 120 first forms the union of the posting lists of the phrase extensions, prior to doing the intersection with the posting lists. The search system 120 identifies phrase extensions by looking up each query phrase Q in the incomplete phrase list 216, as described above.

The result of the intersection is a set of documents that are relevant to the query. Indexing documents by phrases and related phrases, identifying phrases Q in the query, and then expanding the query to include phrase extensions results in the selection of a set of documents that are more relevant to the query then would result in a conventional Boolean based search system in which only documents that contain the query terms are selected.

In one embodiment, the search system 120 can use an optimized mechanism to identify documents responsive to the query without having to intersect all of the posting lists of the query phrases Q. As a result of the structure of the index 150, for each phrase $g_j$, the related phrases $g_k$ are known and identified in the related phrase bit vector for $g_k$. Accordingly, this information can be used to shortcut the intersection process where two or more query phrases are related phrases to each other, or have common related phrases. In those cases, the related phrase bit vectors can be directly accessed, and then used next to retrieve corresponding documents. This process is more fully described as follows.

Given any two query phrases Q1 and Q2, there are three possible cases of relations:

1) Q2 is a related phrase of Q1;
2) Q2 is not a related phrase of Q1 and their respective related phrases Qr1 and Qr2 do not intersect (i.e., no common related phrases); and
3) Q2 is not a related phrase of Q1, but their respective related phrases Qr1 and Qr2 do intersect.

For each pair of query phrases the search system 120 determines the appropriate case by looking up the related phrase bit vector of the query phrases Qp.

The search system 120 proceeds by retrieving the posting list for query phrase Q1, which contains the documents containing Q1, and for each of these documents, a related phrase bit vector. The related phrase bit vector for Q1 will indicated whether phrase Q2 (and each of the remaining query phrases, if any) is a related phrase of Q1 and is present in the document.

If the first case applies to Q2, the search system 120 scans the related phrase bit vector for each document d in Q1's posting list to determine if it has a bit set for Q2. If this bit is not set in for document d in Q1's posting list, then it means that Q2 does not appear in that document. As a result, this document can be immediately eliminated from further consideration. The remaining documents can then be scored. This means further that it is unnecessary for the search system 120 to process the posting lists of Q2 to see which documents it is present in as well, thereby saving compute time.

If the second case applies to Q2, then the two phrases are unrelated to each other. For example the query "cheap bolt action rifle" has two phrases "cheap" and "bolt action rifle". Neither of these phrases is related to each other, and further the related phrases of each of these do not overlap; i.e., "cheap" has related phrases "low cost," "inexpensive," "discount," "bargain basement," and "lousy,", whereas "bolt action rifle" has related phrases "gun," "22 caliber", "magazine fed," and "Armalite AR-30M", which lists thus do not intersect. In this case, the search system 120 does the regular intersection of the posting lists of Q1 and Q2 to obtain the documents for scoring.

If the third case applies, then here the two phrases Q1 and Q2 that are not related, but that do have at least one related phrase in common. For example the phrases "bolt action rifle" and "22" would both have "gun" as a related phase. In this case, the search system 120 retrieves the posting lists of both phrases Q1 and Q2 and intersects the lists to produce a list of documents that contain both phrases.

The search system 120 can then quickly score each of the resulting documents. First, the search system 120 determines a score adjustment value for each document. The score adjustment value is a mask formed from the bits in the positions corresponding to the query phrases Q1 and Q2 in the related phrase bit vector for a document. For example, assume that Q1 and Q2 correspond to the $3^{rd}$ and $6^{th}$ bi-bit positions in the related phrase bit vector for document d, and the bit values in $3^{rd}$ position are (1,1) and the bit values in the $6^{th}$ pair are (1,0), then the score adjustment value is the bit mask "00 00 11 00 00 10". The score adjustment value is then used to mask the related phrase bit vector for the documents, and modified phrase bit vectors then are passed into the ranking function (next described) to be used in calculating a body score for the documents.

2. Ranking a) Ranking Documents Based on Contained Phrases

The search system 120 provides a ranking stage 604 in which the documents in the search results are ranked, using the phrase information in each document's related phrase bit vector, and the cluster bit vector for the query phrases. This approach ranks documents according to the phrases that are contained in the document, or informally "body hits."

As described above, for any given phrase $g_j$, each document d in the $g_j$'s posting list has an associated related phrase bit vector that identifies which related phrases $g_k$ and which secondary related phrases $g_l$ are present in document d. The more related phrases and secondary related phrases present in a given document, the more bits that will be set in the document's related phrase bit vector for the given phrase. The more bits that are set, the greater the numerical value of the related phrase bit vector.

Accordingly, in one embodiment, the search system 120 sorts the documents in the search results according to the value of their related phrase bit vectors. The documents containing the most related phrases to the query phrases Q will have the highest valued related phrase bit vectors, and these documents will be the highest-ranking documents in the search results.

This approach is desirable because semantically, these documents are most topically relevant to the query phrases. Note that this approach provides highly relevant documents even if the documents do not contain a high frequency of the input query terms q, since related phrase information was used to both identify relevant documents, and then rank these documents. Documents with a low frequency of the input query terms may still have a large number of related phrases to the query terms and phrases and thus be more relevant than documents that have a high frequency of just the query terms and phrases but no related phrases.

In a second embodiment, the search system 120 scores each document in the result set according which related phrases of the query phrase Q it contains. This is done as follows:

Given each query phrase Q, there will be some number N of related phrases Qr to the query phrase, as identified during the phrase identification process. As described above, the related query phrases Qr are ordered according to their information gain from the query phrase Q. These related phrases are then assigned points, started with N points for the first related phrase Qr1 (i.e., the related phrase Qr with the highest information gain from Q), then N−1 points for the next related phrase Qr2, then N−2 points for Qr3, and so on, so that the last related phrase QrN is assigned 1 point.

Each document in the search results is then scored by determining which related phrases Qr of the query phrase Q are present, and giving the document the points assigned to each such related phrase Qr. The documents are then sorted from highest to lowest score.

As a further refinement, the search system 120 can cull certain documents from the result set. In some cases documents may be about many different topics; this is particularly the case for longer documents. In many cases, users prefer documents that are strongly on point with respect to a single topic expressed in the query over documents that are relevant to many different topics.

To cull these latter types of documents, the search system 120 uses the cluster information in the cluster bit vectors of the query phrases, and removes any document in which there are more than a threshold number of clusters in the document. For example, the search system 120 can remove any documents that contain more than two clusters. This cluster threshold can be predetermined, or set by the user as a search parameter.

b) Ranking Documents Based on Anchor Phrases

In addition to ranking the documents in the search results based on body hits of query phrases Q, in one embodiment, the search system 120 also ranks the documents based on the appearance of query phrases Q and related query phrases Qr in anchors to other documents. In one embodiment, the search system 120 calculates a score for each document that is a function (e.g., linear combination) of two scores, a body hit score and an anchor hit score.

For example, the document score for a given document can be calculated as follows:

$$\text{Score}=0.30*(\text{body hit score})+0.70*(\text{anchor hit score}).$$

The weights of 0.30 and 0.70 can be adjusted as desired. The body hit score for a document is the numerical value of the highest valued related phrase bit vector for the document, given the query phrases Qp, in the manner described above. Alternatively, this value can directly obtained by the search system 120 by looking up each query phrase Q in the index 150, accessing the document from the posting list of the query phrase Q, and then accessing the related phrase bit vector.

The anchor hit score of a document d a function of the related phrase bit vectors of the query phrases Q, where Q is an anchor term in a document that references document d. When the indexing system 110 indexes the documents in the document collection, it maintains for each phrase a list of the documents in which the phrase is anchor text in an outlink, and also for each document a list of the inlinks (and the associated anchor text) from other documents. The inlinks for a document are references (e.g. hyperlinks) from other documents (referencing documents) to a given document.

To determine the anchor hit score for a given document d then, the search system 120 iterates over the set of referencing documents R (i=1 to number of referencing documents) listed in index by their anchor phrases Q, and sums the following product:

$R_i \cdot Q$·Related phrase bit vector*$D \cdot Q$·Related phrase bit vector.

The product value here is a score of how topical anchor phrase Q is to document D. This score is here called the "inbound score component." This product effectively weights the current document D's related bit vector by the related bit vectors of anchor phrases in the referencing document R. If the referencing documents R themselves are related to the query phrase Q (and thus, have a higher valued related phrase bit vector), then this increases the significance of the current document D score. The body hit score and the anchor hit score are then combined to create the document score, as described above.

Next, for each of the referencing documents R, the related phrase bit vector for each anchor phrase Q is obtained. This is a measure of how topical the anchor phrase Q is to the document R. This value is here called the outbound score component.

From the index 150 then, all of the (referencing document, referenced document) pairs are extracted for the anchor phrases Q. These pairs are then sorted by their associated (outbound score component, inbound score component) values. Depending on the implementation, either of these components can be the primary sort key, and the other can be the secondary sort key. The sorted results are then presented to the user. Sorting the documents on the outbound score component makes documents that have many related phrases to the query as anchor hits, rank most highly, thus representing these documents as "expert" documents. Sorting on the inbound document score makes documents that frequently referenced by the anchor terms the most high ranked.

3. Phrase Based Personalization of Search

Another aspect of the search system 120 is the capability to personalize 606 or customize the ranking of the search results in accordance with a model of the user's particular interests. In this manner, documents that more likely to be relevant to the user's interests are ranked higher in the search results. The personalization of search result is as follows.

As a preliminary matter, it is useful to define a user's interests (e.g., a user model) in terms of queries and documents, both of which can be represented by phrases. For an input search query, a query is represented by the query phrases Q, the related phrases of Qr, and phrase extensions Qe of the query phrases Qp. This set of terms and phrases thus represents the meaning of the query. Next, the meaning of a document is represented by the phrases associated with the page. As described above, given a query and document, the relevant phrases for the document are determined from the body scores (the related bit vectors) for all phrases indexed to the document. Finally, a user can be represented as the union of a set of queries with a set of documents, in terms of the phrases that represent each of these elements. The particular documents to include in the set representing the user can be determined from which documents the user selects in previous search results, or in general browsing of the corpus (e.g., accessing documents on the Internet), using a client-side tool which monitors user actions and destinations.

The process of constructing and using the user model for personalized ranking is as follows.

First, for a given user, a list of the last K queries and P documents accessed is maintained, where K and P are preferably about 250 each. The lists may be maintained in a user account database, where a user is recognized by a login or by browser cookies. For a given user, the lists will be empty the first time the user provides a query.

Next, a query q is received from the user. The related phrases Qr of q are retrieved, along with the phrase extensions, in the manner described above. This forms the query model.

In a first pass (e.g., if there are no stored query information for the user), the search system 120 operates to simply return the relevant documents in the search result to the user's query, without further customized ranking.

A client side browser tool monitors which of the documents in the search results the user accesses, e.g., by clicking on the document link in the search results. These accessed documents form the basis for selecting which phrases will become part of the user model. For each such accessed document, the search system 120 retrieves the document model for the document, which is a list of phrases related to the document. Each phrase that is related to the accessed document is added to the user model.

Next, given the phrases related to an accessed document, the clusters associated with these phrases can be determined from the cluster bit vectors for each phrase. For each cluster, each phrase that is a member of the cluster is determined by looking the phrase up in its related phrase table that contains the cluster number, or cluster bit vector representation as described above. This cluster number is then added to the user model. In addition, for each such cluster, a counter is maintained and incremented each time a phrase in that cluster is added to the user model. These counts may be used as weights, as described below. Thus, the user model is built from phrases included in clusters that are present on a document that the user has expressed an interest in by accessing the document.

The same general approach can be more precisely focused to capture phrase information where a higher level of interest than merely accessing the document is manifested by the user (which the user may do simply to judge if indeed the document is relevant). For example, the collection of phrases into the user model may be limited to those documents that the user has printed, saved, stored as a favorite or link, email to another user, or maintained open in a browser window for an extended period of time (e.g., 10 minutes). These and other actions manifest a higher level of interest in the document.

When another query is received from the user, the related query phrases Qr are retrieved. These related query phrases Qr are intersected with the phrases listed in the user model to determine which phrases are present in both the query and the user model. A mask bit vector is initialized for the related phrases of the query Qr. This bit vector is a bi-bit vector as described above. For each related phrase Qr of the query that is also present in the user model, both of the bits for this related phrase are set in the mask bit vector. The mask bit vector thus represents the related phrases present in both the query and the user model.

The mask bit vector is then used to mask the related phrase bit vector for each document in the current set of search results by ANDing the related phrase bit vector with the mask bit vector. This has the effect of adjusting the body score and the anchor hit score by the mask bit vector. The documents are then scored for their body score and anchor score as before and presented to the user. This approach essentially requires that a document have the query phrases that are included in the user model in order to be highly ranked.

As an alternative embodiment, which does not impose the foregoing tight constraint, the mask bit vector can be cast into array, so that each bit is used to weight the cluster counts for the related phrases in the user model. Thus, each of the cluster counts gets multiplied by 0 or 1, effectively zeroing or maintaining the counts. Next, these counts themselves are used as weights are also used to multiply the related phrases for each document that is being scored. This approach has the benefit of allowing documents that do not have the query phrases as related phrases to still score appropriately.

Finally, the user model may be limited to a current session, where a session is an interval of time for active period of time in search, after which session the user model is dumped. Alternatively, the user model for a given user may be persisted over time, and then down-weighted or aged.

IV. Result Presentation

Figure 7:
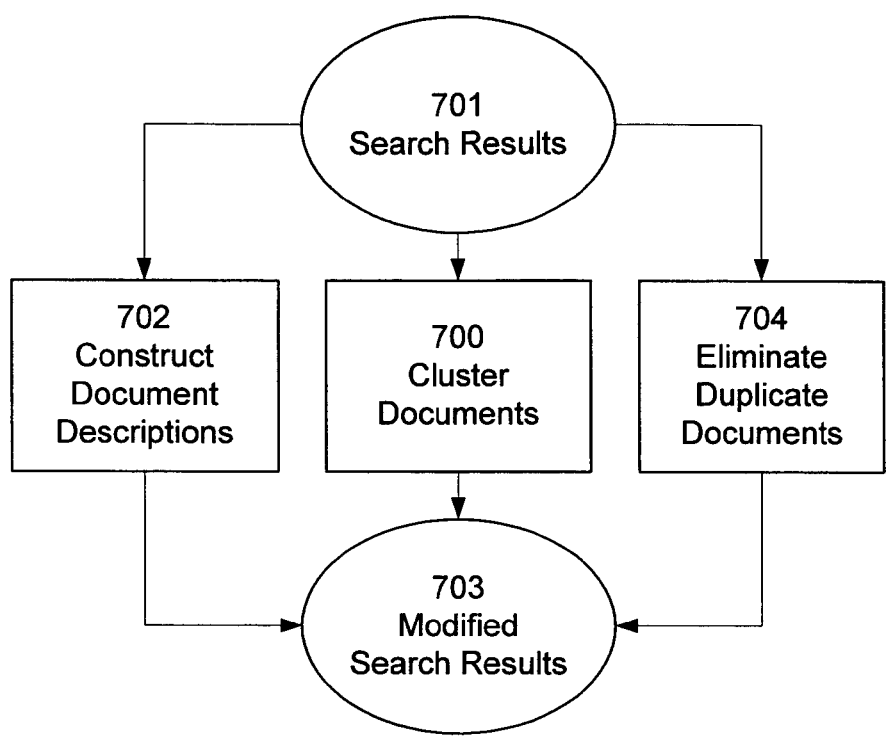
FIG. 7 illustrates operations of the presentation system to present search results.

The presentation system 130 receives the scored and sorted search results from the search system 120, and performs further organizational, annotation, and clustering operations prior to presenting the results to the user. These operations facilitate the user's understanding of the content of the search results, eliminate duplicates, and provide a more representative sampling of the search results. FIG. 7 illustrates the main functional operations of the presentation system 130:

700: Cluster documents according to topic clusters
702: Generate document descriptions
704: Eliminate duplicate documents.

Each of these operations takes as an input the search results 701 and outputs modified search results 703. As suggested by FIG. 7, the order of these operations is independent, and may be varied as desired for a given embodiment, and thus the inputs may be pipelined instead of being in parallel as shown.

1. Dynamic Taxonomy Generation for Presentation

For a given query, it is typical to return hundreds, perhaps even thousands of documents that satisfy the query. In many cases, certain documents, while having different content from each other, are sufficiently related to form a meaningful group of related documents, essentially a cluster. Most users however, do not review beyond the first 30 or 40 documents in the search results. Thus, if the first 100 documents for example, would come from three clusters, but the next 100 documents represent an additional four clusters, then without further adjustment, the user will typically not review these later documents, which in fact may be quite relevant to the user's query since they represent a variety of different topics related to the query. Thus, it is here desirable to provide the user with a sample of documents from each cluster, thereby exposing the user to a broader selection of different documents from the search results. The presentation system 130 does this as follows.

As in other aspects of the system 100, the presentation system 130 makes use of the related phrase bit vector for each document d in the search results. More specifically, for each query phrase Q, and for each document d in Q's posting list, the related phrase bit vector indicates which related phrases Qr are present in the document. Over the set of documents in the search results then, for each related phrase Qr, a count is determined for how many documents contain the related phrase Qr by adding up the bit values in the bit position corresponding to Qr. When summed and sorted over the search results, the most frequently occurring related phrases Qr will be indicated, each of which will be a cluster of documents. The most frequently occurring related phrase is the first cluster, which takes as its name its related phrase Qr, and so on for the top three to five clusters. Thus, each of the top clusters has been identified, along with the phrase Qr as a name or heading for the cluster.

Now, documents from each cluster can be presented to the user in various ways. In one application, a fixed number of documents from each cluster can be presented, for example, the 10 top scoring documents in each cluster. In another application, a proportional number of documents from each cluster may be presented. Thus, if there are 100 documents in the search result, with 50 in cluster 1, 30 in cluster 2, in cluster 3, 7 in cluster 4, and 3 in cluster 5, and its desired to present only 20 documents, then the documents would be select as follows: 10 documents from cluster 1; 7 documents from cluster 2, 2 documents from cluster 3, and 1 document from cluster 4. The documents can then be shown to the user, grouped accordingly under the appropriate cluster names as headings.

For example, assume a search query of "blue merle agility training", for which the search system 120 retrieves 100 documents. The search system 120 will have already identified "blue merle" and "agility training" as query phrases. The related phrases of these query phrases as:

"blue merle":: "Australian Shepherd," "red merle," "tricolor," "aussie";

"agility training":: "weave poles," "teeter," "tunnel," "obstacle," "border collie".

The presentation system 130 then determines for each of the above related phrases of each query phrase, a count of the number of documents contain such phrase. For example, assume that the phrase "weave poles" appears in 75 of the 100 documents, "teeter" appears in 60 documents, "red merle" appears in 50 documents. Then the first cluster is named "weave poles" and a selected number of documents from that cluster are presented; the second cluster is named "teeter," and selected number are presented as well, and so forth. For a fixed presentation, 10 documents from each cluster may be selected. A proportional presentation would use a proportionate number of documents from each cluster, relative to the total number of documents.

2. Topic Based Document Descriptions

A second function of the presentation system 130 is the creation 702 of a document description that can inserted into the search result presentation for each document. These descriptions are based on the related phrases that are present in each document, and thus help the user understand what the document is about in a way that is contextually related to the search. The document descriptions can be either general or personalized to the user.

a) General Topic Document Descriptions

As before, given a query, the search system 120 has determined the related query phrases Qr and the phrase extensions of the query phrases as well, and then identified the relevant documents for the query. The presentation system 130 accesses each document in the search results and perform the follow operations.

First, the presentation system 130 ranks the sentences of the document by the number of instances of query phrases Q, related query phrases Qr, and phrase extensions Qp, thereby maintaining for each sentence of a document counts of these three aspects.

Then the sentences are sorted by these counts, with the first sort key being the count of query phrases Q, the second sort key being the count of related query phrases Qr, and the final sort key being the count of phrase extensions Qp.

Finally, the top N (e.g., 5) sentences following the sort are used as the description of the document. This set of sentences can be formatted and included in the presentation of the document in the modified search results 703. This process is repeated for some number of documents in the search results, and may be done on demand each time the user requests a next page of the results.

b) Personalized Topic Based Document Descriptions

In embodiments where personalization of the search results is provided, the document descriptions can likewise be personalized to reflect the user interests as expressed in the user model. The presentation system 130 does this as follows.

First, the presentation system 130 determines, as before, the related phrases that are relevant to the user by intersecting the query related phrases Qr with the user model (which lists the phrases occurring in documents accessed by the user).

The presentation system 130 then stable sorts this set of user related phrases Ur according to the value of the bit vectors themselves, prepending the sorted list to the list of query related phrases Qr, and removes any duplicate phrases. The stable sort maintains the existing order of equally ranked phrases. This results in a set of related phrases which related to the query or the user, called set Qu.

Now, the presentation system 130 uses this ordered list of phrases as the basis for ranking the sentences in each document in the search results, in a manner similar to the general document description process described above. Thus, for a given document, the presentation system 130 ranks the sentences of the document by the number of instances of each of the user related phrases and the query related phrases Qu, and sorts the ranked sentences according to the query counts, and finally sorts based on the number of phrase extensions for each such phrase. Whereas previously the sort keys where in the order of the query phrases Q, related query phrases Qr, and phrase extension Qp, here the sort keys are in the order of the highest to lowest ranked user related phrases Ur.

Again, this process is repeated for the documents in the search results (either on demand or aforehand). For each such document then the resulting document description comprises the N top ranked sentences from the document. Here, these sentences will the ones that have the highest numbers of user related phrases Ur, and thus represent the key sentences of the document that express the concepts and topics most relevant to the user (at least according to the information captured in the user model).

3. Duplicate Document Detection and Elimination

In large corpuses such as the Internet, it is quite common for there to be multiple instances of the same document, or portions of a document in many different locations. For example, a given news article produced by a news bureau such as the Associated Press, may be replicated in a dozen or more websites of individual newspapers. Including all of these duplicate documents in response to a search query only burdens the user with redundant information, and does not usefully respond to the query. Thus, the presentation system 130 provides a further capability 704 to identify documents that are likely to be duplicates or near duplicates of each other, and only include one of these in the search results. Consequently, the user receives a much more diversified and robust set of results, and does not have to waste time reviewing documents that are duplicates of each other. The presentation system 130 provides the functionality as follows.

The presentation system 130 processes each document in the search result set 701. For each document d, the presentation system 130 first determines the list of related phrases R associated with the document. For each of these related phrases, the presentation system 130 ranks the sentences of the document according to the frequency of occurrence of each of these phrases, and then selects the top N (e.g., 5 to 10) ranking sentences. This set of sentences is then stored in association with the document. One way to do this is to concatenate the selected sentences, and then take use a hash table to store the document identifier.

Then, the presentation system 130 compares the selected sentences of each document d to the selected sentences of the other documents in the search results 701, and if the selected sentences match (within a tolerance), the documents are presumed to be duplicates, and one of them is removed from the search results. For example, the presentation system 130 can hash the concatenated sentences, and if the hash table already has an entry for the hash value, then this indicates that the current document and presently hashed document are duplicates. The presentation system 130 can then update the table with the document ID of one of the documents. Preferably, the presentation system 130 keeps the document that has a higher page rank or other query independent measure of document significance. In addition, the presentation system 130 can modify the index 150 to remove the duplicate document, so that it will not appear in future search results for any query.

The same duplicate elimination process may be applied by the indexing system 110 directly. When a document is crawled, the above described document description process is performed to obtain the selected sentences, and then the hash of these sentences. If the hash table is filled, then again the newly crawled document is deemed to be a duplicate of a previous document. Again, the indexing system 110 can then keep the document with the higher page rank or other query independent measure.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of selecting documents from a document collection in response to a query, the method comprising:
   receiving a query;
   identifying, by at least one processor of a computing system, an incomplete phrase in the query, wherein phrases predicted by the incomplete phrase in the document collection include only phrase extensions of the incomplete phrase;
   identifying, by at least one processor of the computing system, a phrase extension of the incomplete phrase, wherein the phrase extension of the incomplete phrase is a sequence of words that begins with the incomplete phrase but that is longer than the incomplete phrase, and wherein the incomplete phrase predicts the phrase extension based an actual co-occurrence rate of the phrase extension and the incomplete phrase in the document collection exceeding an expected co-occurrence rate of the phrase extension and the incomplete phrase in the document collection; and
   selecting, by at least one processor of the computing system, documents from the document collection, wherein the selected documents contain the phrase extension.

2. The method of claim 1, wherein the expected co-occurrence rate of the phrase extension is a function of a number of documents in the document collection that include the identified phrase and a number of documents in the document collection that include the phrase extension, and the actual co-occurrence rate being a function of a number of times the phrase extension appears within a threshold number of words of the identified phrase in the document collection.

3. The method of claim 1, wherein identifying the incomplete phrase in the query includes:
   identifying a candidate phrase in the query;
   comparing the candidate phrase to an incomplete phrase in a list of incomplete phrases that are present in documents of the document collection; and
   if the candidate phrase matches to the incomplete phrase, identifying the candidate phrase as an incomplete phrase and identifying a phrase extension associated with the incomplete phrase as the phrase extension of the incomplete phrase.

4. The method of claim 1, further comprising suggesting, by at least one processor of the computing system, the phrase extension to the user to use in the query.

5. The method of claim 4, wherein the suggested phrase extension is selected from a plurality of phrase extensions of the identified phrase, based on information gains of the plurality of phrase extensions given the identified phrase.

6. The method of claim 4, further comprising receiving a selection from the user of the suggested phrase extension to use in the query.

7. The method of claim 1, further comprising providing the selected documents to a user in response to the query.

8. A computer-implemented method of selecting documents from a document collection in response to a query, the method comprising:
   receiving a query;
   identifying, by at least one processor of a computing system, an incomplete phrase in the query, wherein phrases predicted by the incomplete phrase in the document collection include only phrase extensions of the incomplete phrase;
   identifying, by at least one processor of the computing system, a phrase extension of the incomplete phrase, wherein the phrase extension of the incomplete phrase is a sequence of words that begins with the incomplete phrase but that is longer than the incomplete phrase, and wherein the incomplete phrase predicts the phrase extension based an actual co-occurrence rate of the phrase extension and the incomplete phrase in the document collection exceeding an expected co-occurrence rate of the phrase extension and the incomplete phrase in the document collection; and
   suggesting, by at least one processor of the computing system, the phrase extension to the user to use in the query.

9. The method of claim 8, wherein the expected co-occurrence rate of the phrase extension is a function of a number of documents in the document collection that include the identified phrase and a number of documents in the document collection that include the phrase extension, and the actual co-occurrence rate being a function of a number of times the phrase extension appears within a threshold number of words of the identified phrase in the document collection.

10. The method of claim 8, wherein identifying the incomplete phrase in the query includes:
    identifying a candidate phrase in the query;

comparing the candidate phrase to an incomplete phrase in a list of incomplete phrases that are present in documents of the document collection; and if the candidate phrase matches to the incomplete phrase, identifying the candidate phrase as an incomplete phrase and identifying a phrase extension associated with the incomplete phrase as the phrase extension of the incomplete phrase.

11. The method of claim 8, wherein the suggested phrase extension is selected from a plurality of phrase extensions of the identified phrase, based on information gains of the plurality of phrase extensions given the identified phrase.

12. The method of claim 8, further comprising receiving a selection from the user of the suggested phrase extension to use in the query.

13. The method of claim 8, further comprising selecting, by at least one processor of the computing system, documents from the document collection, wherein the selected documents contain the phrase extension.

14. The method of claim 13, further comprising providing the selected documents to a user in response to the query.

15. A computer-implemented method of:
receiving a query from a user;
identifying a multiple word phrase in the query;
identifying, by at least one processor of a computing system, a phrase extension of the identified phrase, wherein the phrase extension of the identified phrase is a sequence of words that begins with the identified phrase but is longer than the identified phrase, and wherein the identified phrase predicts the phrase extension based on a measure of an actual co-occurrence rate of the phrase extension and the identified phrase exceeding an expected co-occurrence rate of the phrase extension and the identified phrase in the document collection; and
selecting, by at least one processor of the computing system, documents from the document collection containing the phrase extension.

16. The method of claim 15, wherein the identified phrase is an incomplete phrase, wherein phrases predicted by the incomplete phrase in the document collection include only phrase extensions of the incomplete phrase.

17. The method of claim 15, further comprising suggesting, by at least one processor of the computing system, the phrase extension to the user to use in the query.

18. The method of claim 17, wherein the phrase extension is selected from a plurality of phrase extensions of the identified phrase, based on information gains of the plurality of phrase extensions given the identified phrase.

19. The method of claim 17, further comprising receiving a selection from the user of the suggested phrase extension to use in the query.

20. The method of claim 15, wherein selecting the documents comprises:
combining a posting list of identified phrase and a posting list of the phrase extension of the identified phrase to form a combined posting list; and
selecting documents appearing in the combined posting list.

21. The method of claim 15, further comprising providing the selected documents to a user in response to the query.

22. The method of claim 15, wherein the expected co-occurrence rate of the phrase extension is a function of a number of documents in the document collection that include the identified phrase and of a number of documents in the document collection that include the phrase extension, and the actual co-occurrence rate being a function of a number of times the phrase extension appears within a threshold number of words of the identified phrase in the document collection.

23. A computer-implemented method of:
receiving a query from a user;
identifying a multiple word phrase in the query;
identifying, by at least one processor of a computing system, a phrase extension of the identified phrase, wherein the phrase extension of the identified phrase is a sequence of words that begins with the identified phrase but is longer than the identified phrase, and wherein the identified phrase predicts the phrase extension based on a measure of an actual co-occurrence rate of the phrase extension and the identified phrase exceeding an expected co-occurrence rate of the phrase extension and the identified phrase in the document collection; and
suggesting, by at least one processor of the computing system, the phrase extension to the user to use in the query.

24. The method of claim 23, wherein the identified phrase is an incomplete phrase, wherein phrases predicted by the incomplete phrase in the document collection include only phrase extensions of the incomplete phrase.

25. The method of claim 23, wherein the phrase extension is selected from a plurality of phrase extensions of the identified phrase, based on information gains of the plurality of phrase extensions given the identified phrase.

26. The method of claim 23, further comprising receiving a selection from the user of the suggested phrase extension to use in the query.

27. The method of claim 23, further comprising selecting, by at least one processor of the computing system, documents from the document collection containing the phrase extension.

28. The method of claim 27, further comprising providing the selected documents to a user in response to the query.

29. The method of claim 23, wherein the expected co-occurrence rate of the phrase extension is a function of a number of documents in the document collection that include the identified phrase and of a number of documents in the document collection that include the phrase extension, and the actual co-occurrence rate being a function of a number of times the phrase extension appears within a threshold number of words of the identified phrase in the document collection.

30. A system for selecting documents from a document collection in response to a query, the system comprising:
one or more memory devices configured store executable instructions; and
one or more processors configured to execute the stored instructions to cause the system to:
receive a query;
identify an incomplete phrase in the query, wherein phrases predicted by the incomplete phrase in the document collection include only phrase extensions of the incomplete phrase;
identify a phrase extension of the incomplete phrase, wherein the phrase extension of the incomplete phrase is a sequence of words that begins with the incomplete phrase but that is longer than the incomplete phrase, and wherein the incomplete phrase predicts the phrase extension based an actual co-occurrence rate of the phrase extension and the incomplete phrase in the document collection exceeding an expected co-occurrence rate of the phrase extension and the incomplete phrase in the document collection; and select documents from the document collection, wherein the selected documents contain the phrase extension.

31. The system of claim 30, wherein the expected co-occurrence rate of the phrase extension is a function of a number of documents in the document collection that include the identified phrase and a number of documents in the document collection that include the phrase extension, and the actual co-occurrence rate being a function of a number of times the phrase extension appears within a threshold number of words of the identified phrase in the document collection.

32. The system of claim 30, wherein identifying the incomplete phrase in the query includes:
identifying a candidate phrase in the query;
comparing the candidate phrase to an incomplete phrase in a list of incomplete phrases that are present in documents of the document collection; and
if the candidate phrase matches to the incomplete phrase, identifying the candidate phrase as an incomplete phrase and identifying a phrase extension associated with the incomplete phrase as the phrase extension of the incomplete phrase.

33. The system of claim 30, wherein the one or more processors are further configured to execute the stored instructions to cause the system to suggest the phrase extension to the user to use in the query.

34. The system of claim 33, wherein the suggested phrase extension is selected from a plurality of phrase extensions of the identified phrase, based on information gains of the plurality of phrase extensions given the identified phrase.

35. The system of claim 33, wherein the one or more processors are further configured to execute the stored instructions to cause the system to receive a selection from the user of the suggested phrase extension to use in the query.

36. The system of claim 30, wherein the one or more processors are further configured to execute the stored instructions to cause the system to provide the selected documents to a user in response to the query.

37. A system for selecting documents from a document collection in response to a query, the system comprising:
one or more memory devices configured store executable instructions; and
one or more processors configured to execute the stored instructions to cause the system to:
receive a query;
identify an incomplete phrase in the query, wherein phrases predicted by the incomplete phrase in the document collection include only phrase extensions of the incomplete phrase;
identify a phrase extension of the incomplete phrase, wherein the phrase extension of the incomplete phrase is a sequence of words that begins with the incomplete phrase but that is longer than the incomplete phrase, and wherein the incomplete phrase predicts the phrase extension based an actual co-occurrence rate of the phrase extension and the incomplete phrase in the document collection exceeding an expected co-occurrence rate of the phrase extension and the incomplete phrase in the document collection; and
suggest the phrase extension to the user to use in the query.

38. The system of claim 37, wherein the expected co-occurrence rate of the phrase extension is a function of a number of documents in the document collection that include the identified phrase and a number of documents in the document collection that include the phrase extension, and the actual co-occurrence rate being a function of a number of times the phrase extension appears within a threshold number of words of the identified phrase in the document collection.

39. The system of claim 37, wherein identifying the incomplete phrase in the query includes:
identifying a candidate phrase in the query;
comparing the candidate phrase to an incomplete phrase in a list of incomplete phrases that are present in documents of the document collection; and
if the candidate phrase matches to the incomplete phrase, identifying the candidate phrase as an incomplete phrase and identifying a phrase extension associated with the incomplete phrase as the phrase extension of the incomplete phrase.

40. The system of claim 37, wherein the suggested phrase extension is selected from a plurality of phrase extensions of the identified phrase, based on information gains of the plurality of phrase extensions given the identified phrase.

41. The system of claim 37, wherein the one or more processors are further configured to execute the stored instructions to cause the system to receive a selection from the user of the suggested phrase extension to use in the query.

42. The system of claim 37, wherein the one or more processors are further configured to execute the stored instructions to cause the system to select documents from the document collection, wherein the selected documents contain the phrase extension.

43. The system of claim 42, wherein the one or more processors are further configured to execute the stored instructions to cause the system to provide the selected documents to a user in response to the query.

44. A system comprising:
one or more memory devices configured store executable instructions; and
one or more processors configured to execute the stored instructions to cause the system to:
receive a query from a user;
identify a multiple word phrase in the query;
identify a phrase extension of the identified phrase, wherein the phrase extension of the identified phrase is a sequence of words that begins with the identified phrase but is longer than the identified phrase, and wherein the identified phrase predicts the phrase extension based on a measure of an actual co-occurrence rate of the phrase extension and the identified phrase exceeding an expected co-occurrence rate of the phrase extension and the identified phrase in the document collection; and
select documents from the document collection containing the phrase extension.

45. The system of claim 44, wherein the identified phrase is an incomplete phrase, wherein phrases predicted by the incomplete phrase in the document collection include only phrase extensions of the incomplete phrase.

46. The system of claim 44, wherein the one or more processors are further configured to execute the stored instructions to cause the system to suggest the phrase extension to the user to use in the query.

47. The system of claim 46, wherein the phrase extension is selected from a plurality of phrase extensions of the identified phrase, based on information gains of the plurality of phrase extensions given the identified phrase.

48. The system of claim 46, wherein the one or more processors are further configured to execute the stored instructions to cause the system to receive a selection from the user of the suggested phrase extension to use in the query.

49. The system of claim 44, wherein selecting the documents includes:
 combining a posting list of identified phrase and a posting list of the phrase extension of the identified phrase to form a combined posting list; and
 selecting documents appearing in the combined posting list.

50. The system of claim 44, wherein the one or more processors are further configured to execute the stored instructions to cause the system to provide the selected documents to a user in response to the query.

51. The system of claim 44, wherein the expected co-occurrence rate of the phrase extension is a function of a number of documents in the document collection that include the identified phrase and of a number of documents in the document collection that include the phrase extension, and the actual co-occurrence rate being a function of a number of times the phrase extension appears within a threshold number of words of the identified phrase in the document collection.

52. A system comprising:
 one or more memory devices configured store executable instructions; and
 one or more processors configured to execute the stored instructions to cause the system to:
  receive a query from a user;
  identify a multiple word phrase in the query;
  identify a phrase extension of the identified phrase, wherein the phrase extension of the identified phrase is a sequence of words that begins with the identified phrase but is longer than the identified phrase, and wherein the identified phrase predicts the phrase extension based on a measure of an actual co-occurrence rate of the phrase extension and the identified phrase exceeding an expected co-occurrence rate of the phrase extension and the identified phrase in the document collection; and
  suggest the phrase extension to the user to use in the query.

53. The system of claim 52, wherein the identified phrase is an incomplete phrase, wherein phrases predicted by the incomplete phrase in the document collection include only phrase extensions of the incomplete phrase.

54. The system of claim 52, wherein the phrase extension is selected from a plurality of phrase extensions of the identified phrase, based on information gains of the plurality of phrase extensions given the identified phrase.

55. The system of claim 52, wherein the one or more processors are further configured to execute the stored instructions to cause the system to receive a selection from the user of the suggested phrase extension to use in the query.

56. The system of claim 52, wherein the one or more processors are further configured to execute the stored instructions to cause the system to select documents from the document collection containing the phrase extension.

57. The system of claim 56, wherein the one or more processors are further configured to execute the stored instructions to cause the system to provide the selected documents to a user in response to the query.

58. The system of claim 52, wherein the expected co-occurrence rate of the phrase extension is a function of a number of documents in the document collection that include the identified phrase and of a number of documents in the document collection that include the phrase extension, and the actual co-occurrence rate being a function of a number of times the phrase extension appears within a threshold number of words of the identified phrase in the document collection.

* * * * *